US012482989B2

(12) United States Patent
Lee

(10) Patent No.: US 12,482,989 B2
(45) Date of Patent: Nov. 25, 2025

(54) CELL-MONITORING CONNECTOR FOR FUEL CELL

(71) Applicants: Hyundai Motor Company, Seoul (KR); Kia Corporation, Seoul (KR)

(72) Inventor: Jong Jun Lee, Seongnam-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 600 days.

(21) Appl. No.: 17/820,193

(22) Filed: Aug. 16, 2022

(65) Prior Publication Data

US 2023/0112651 A1 Apr. 13, 2023

(30) Foreign Application Priority Data

Oct. 12, 2021 (KR) .......................... 10-2021-0135199

(51) Int. Cl.
*H01R 13/641* (2006.01)
*G01R 31/364* (2019.01)
*H01M 8/04537* (2016.01)
*H01M 8/241* (2016.01)
*H01R 13/639* (2006.01)

(52) U.S. Cl.
CPC ......... *H01R 13/641* (2013.01); *G01R 31/364* (2019.01); *H01M 8/04559* (2013.01); *H01M 8/241* (2013.01); *H01R 13/639* (2013.01)

(58) Field of Classification Search
CPC ............ H01R 13/4361; H01R 13/4362; H01R 13/506; H01R 13/639; H01R 13/641
USPC .................................................. 439/351, 752
See application file for complete search history.

(56) References Cited

U.S. PATENT DOCUMENTS

| 4,200,350 A | * | 4/1980 | Zimmerman, Jr. | .. H01R 13/424 439/752 |
| 5,281,168 A | * | 1/1994 | Krehbiel | ............ H01R 13/4362 439/598 |
| 5,462,458 A | * | 10/1995 | Sagawa | .............. H01R 13/4362 439/752 |
| 5,928,038 A | * | 7/1999 | Berg | .................. H01R 13/6272 439/752 |

(Continued)

FOREIGN PATENT DOCUMENTS

| JP | 2007200633 A | 8/2007 |
| JP | 2015088318 A | 5/2015 |

(Continued)

*Primary Examiner* — Marcus E Harcum
(74) *Attorney, Agent, or Firm* — Slater Matsil, LLP

(57) ABSTRACT

In an embodiment a cell-monitoring connector includes a housing including a lock portion corresponding to a groove portion defined by lock recesses stacked and overlapped in the first direction, wherein the lock recesses are formed in at least one of upper portions or lower portions of terminals protruding in a second direction, the second direction intersecting the first direction toward the cell-monitoring connector from side portions of separators included in the plurality of unit cells and a connector position assurance (CPA) including a lower portion configured to be inserted into the lock portion of the housing in a third direction and to be locked in the groove portion and an upper portion extending from the lower portion in the third direction, the upper portion having a top surface having an area larger than an area of the lower portion in a direction intersecting the third direction.

20 Claims, 33 Drawing Sheets

(56) References Cited

U.S. PATENT DOCUMENTS

| | | | | |
|---|---|---|---|---|
| 5,989,066 | A * | 11/1999 | Cox | H01R 13/4365 439/752 |
| 6,019,645 | A * | 2/2000 | Avery | H01R 13/5825 439/456 |
| 6,106,340 | A * | 8/2000 | Myer | H01R 13/4367 439/752 |
| 6,139,375 | A * | 10/2000 | Konoya | H01R 13/4361 439/752 |
| 6,844,093 | B2 * | 1/2005 | Kikuchi | H01M 8/241 429/432 |
| 7,044,808 | B1 * | 5/2006 | Foltz | H01R 13/4362 439/752 |
| 7,108,542 | B2 * | 9/2006 | Ishiwa | H01R 13/641 439/352 |
| 7,223,131 | B2 * | 5/2007 | Moll | H01R 13/506 439/752 |
| 7,258,943 | B2 * | 8/2007 | Ariyoshi | H01M 8/02 429/468 |
| 7,281,939 | B1 * | 10/2007 | Stock | H01R 13/4361 439/364 |
| 8,470,492 | B2 | 6/2013 | Aoto | |
| 8,951,066 | B2 * | 2/2015 | Glick | H01R 13/426 439/752 |
| 9,039,462 | B2 | 5/2015 | Yoon et al. | |
| 9,705,228 | B2 * | 7/2017 | Caldwell | H01R 13/6397 |
| 9,742,116 | B1 * | 8/2017 | Nishiyama | H01R 13/641 |
| 10,024,927 | B2 | 7/2018 | Katano et al. | |
| 10,116,091 | B2 * | 10/2018 | Salgado | H01R 13/62927 |
| 10,461,457 | B1 * | 10/2019 | Aono | H01R 13/4223 |
| 10,505,321 | B2 | 12/2019 | Hood | |
| 10,673,169 | B2 * | 6/2020 | Jabrane | H01R 13/6272 |
| 11,114,788 | B2 * | 9/2021 | Kim | H01R 13/4361 |
| 11,251,560 | B2 * | 2/2022 | Fernandes | H01R 13/6271 |
| 2004/0132351 | A1 * | 7/2004 | Miyakawa | H01R 13/4361 439/752 |
| 2006/0172612 | A1 * | 8/2006 | Wasalaski | H01R 13/447 439/752 |
| 2007/0054543 | A1 * | 3/2007 | Moll | H01R 13/518 439/489 |
| 2007/0281555 | A1 * | 12/2007 | Suemitsu | H01R 13/424 439/752 |
| 2020/0176792 | A1 | 6/2020 | Munthe et al. | |
| 2021/0091502 | A1 * | 3/2021 | Sheng | H01R 13/4361 |
| 2022/0085546 | A1 * | 3/2022 | Grek | H01R 13/4362 |
| 2022/0115814 | A1 * | 4/2022 | Margrave | H01R 13/641 |

FOREIGN PATENT DOCUMENTS

| | | |
|---|---|---|
| JP | 2020113464 A | 7/2020 |
| KR | 20100058995 A * | 6/2010 |
| KR | 101337937 B1 | 12/2013 |
| KR | 102212446 B1 | 2/2021 |

\* cited by examiner

CELL-MONITORING CONNECTOR FOR FUEL CELL

CROSS-REFERENCE TO RELATED APPLICATIONS

This application claims the benefit of Korean Patent Application No. 10-2021-0135199, filed on Oct. 12, 2021, which is hereby incorporated by reference as if fully set forth herein.

TECHNICAL FIELD

Embodiments relate to a cell-monitoring connector for a fuel cell.

BACKGROUND

A cell stack of a fuel cell may supply power, generated through electrochemical reaction between air supplied to one surface of a polymer electrolyte membrane and hydrogen supplied to the opposite surface of the polymer electrolyte membrane, to an external load.

A cell stack may have a structure in which hundreds of cells are stacked. When the unit cells operate normally during the operation of the cell stack, the unit cells may form a predetermined magnitude of voltage. If any one of hundreds of cells fails to exhibit normal performance, the total output of the cell stack is lowered. If the reverse voltage phenomenon continues, operation of the cell stack needs to be stopped. A cell-monitoring connector checks the state of each of the unit cells of the cell stack and continuously monitors the voltage of the unit cells. To this end, the cell-monitoring connector may be electrically connected to the cells in order to check the voltage of each of the unit cells constituting the cell stack. Studies on various structures for electrical connection between the cell-monitoring connector and the cell stack have been conducted.

Korean Patent Registration No. 10-1337937 (Registered on Dec. 2, 2013, and Entitled "CONNECTOR FOR MEASURING CELL VOLTAGE OF FUEL CELL STACK")

SUMMARY

Embodiments provide a cell-monitoring connector for a fuel cell that substantially obviates one or more problems due to limitations and disadvantages of the related art.

Embodiments provide a cell-monitoring connector for a fuel cell. Further embodiment provide a cell-monitoring connector which is configured to be easily and conveniently connected to a fuel cell.

A cell-monitoring connector for a fuel cell according to an embodiment, which is mounted to a plurality of unit cells stacked in a first direction, may include a housing including a lock portion formed corresponding to a groove portion defined by lock recesses stacked and overlapped in the first direction, the lock recesses being formed in at least one of upper portions or lower portions of terminals protruding in a second direction, which intersects the first direction, toward the cell-monitoring connector from side portions of separators included in the plurality of unit cells, and a CPA configured to be selectively inserted into the lock portion in a third direction, which intersects each of the first direction and the second direction, and to be locked in the groove portion in order to prevent the housing from being separated from the separators in the second direction. The CPA may include a lower portion configured to be inserted into the lock portion of the housing in the third direction and to be locked in the groove portion, and an upper portion extending from the lower portion in the third direction, the upper portion having a top surface having an area larger than the area of the lower portion in a direction intersecting the third direction.

For example, the CPA may have therein an insertion hole inwardly recessed in the second direction in order to receive a removal tool inserted thereinto from the outside.

For example, the insertion hole may be located at the lowermost end of the upper portion.

For example, the insertion hole may be located between the lowermost end and the uppermost end of the upper portion.

For example, the height of the insertion hole in the third direction may gradually decrease from the entrance thereof to the innermost portion thereof.

For example, the housing may include a first CPA configured to be locked in the groove portion formed by arrangement of the lock recesses formed in the upper portions of the terminals, and a second CPA configured to be locked in the groove portion formed by arrangement of the lock recesses formed in the lower portions of the terminals.

For example, the insertion hole may include a first insertion hole formed in the first CPA and a second insertion hole formed in the second CPA, and the first insertion hole and the second insertion hole may have shapes that are symmetrical to each other in the third direction with respect to the center of the housing.

For example, when the CPA is locked in the groove portion, the top surface of the CPA and the top surface of the housing may be located in the same horizontal plane.

For example, the cell-monitoring connector may further include connection terminals configured to be inserted into connection terminal insertion holes so as to be connected to the terminals, the connection terminal insertion holes being formed in the front surface of the housing while communicating with slits formed in the rear surface of the housing, and a TPA configured to be mounted to the front surface of the housing in order to press the connection terminals inserted into the housing.

For example, the TPA may include an upper portion, and, in the state in which one side of the removal tool is inserted into the insertion hole, when the opposite side of the removal tool is pressed in the third direction, the upper portion of the TPA may support the lower surface of the removal tool so as to unlock the CPA from the groove portion.

For example, the housing may include a locking protrusion protruding in the third direction, and the TPA may include a fixing piece configured to be engaged with the locking protrusion so as to fix the TPA when the opposite side of the removal tool is pressed in the third direction.

For example, the top surface of the upper portion may correspond to a press-fit surface that is pressed when the CPA is inserted into the lock portion in the third direction.

For example, the CPA may include a plurality of engagement protrusions protruding in the first direction, and the housing may have therein a plurality of protrusion-receiving recesses formed to receive the plurality of engagement protrusions in a slide-fitting manner when the plurality of engagement protrusions is pressed in the third direction.

For example, some of the plurality of engagement protrusions may protrude in the first direction from first opposite outer side surfaces of the CPA, which are located opposite each other in the first direction among outer side surfaces of the CPA, and remaining ones of the plurality of engagement protrusions may protrude in the first direction from second opposite outer side surfaces of the CPA, which are spaced apart from or extend from the first opposite outer side surfaces in the second direction.

For example, the plurality of engagement protrusions may include a first engagement protrusion configured to primarily assemble the CPA that has not been assembled to the housing to the housing, and a second engagement protrusion configured to fix the CPA that has been primarily assembled to the housing to the housing.

For example, the CPA may include at least one shift-preventing portion protruding in the first direction, and the housing may have a shift-preventing-portion-receiving recess formed therein to receive the at least one shift-preventing portion inserted thereinto in the third direction.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF ILLUSTRATIVE EMBODIMENTS

Figure 1:
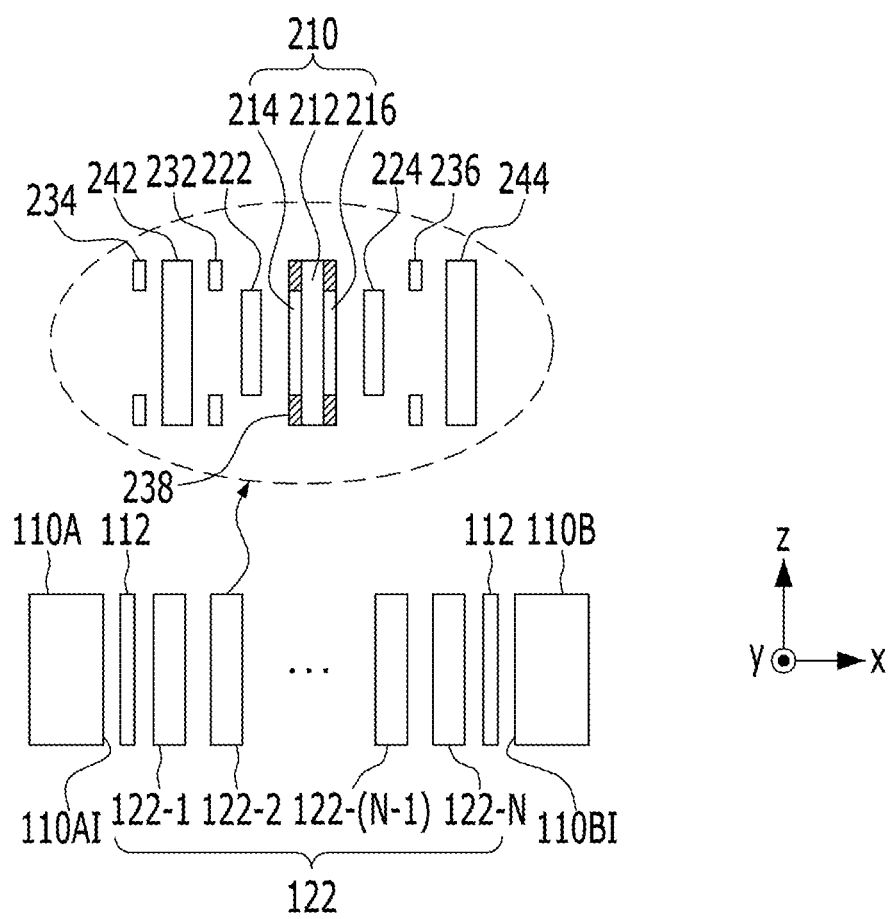
FIG. 1 is a cross-sectional view of end plates and a cell stack of a fuel cell.

The present disclosure will now be described more fully hereinafter with reference to the accompanying drawings, in which various embodiments are shown. The examples, however, may be embodied in many different forms and should not be construed as being limited to the embodiments set forth herein. Rather, these embodiments are provided so that this disclosure will be more thorough and complete, and will more fully convey the scope of the disclosure to those skilled in the art.

It will be understood that when an element is referred to as being "on" or "under" another element, it may be directly on/under the element, or one or more intervening elements may also be present.

When an element is referred to as being "on" or "under", "under the element" as well as "on the element" may be included based on the element.

In addition, relational terms, such as "first", "second", "on/upper part/above" and "under/lower part/below", are used only to distinguish between one subject or element and another subject or element, without necessarily requiring or involving any physical or logical relationship or sequence between the subjects or elements.

Hereinafter, cell-monitoring connectors (or fuel stack voltage monitors (FSVMs)) 300A, 300B, 300C, and 300D for fuel cells according to embodiments will be described with reference to the accompanying drawings. The cell-monitoring connectors 300A, 300B, 300C, and 300D for fuel cells will be described using the Cartesian coordinate system (x-axis, y-axis, z-axis) for convenience of description, but may also be described using other coordinate systems. In the Cartesian coordinate system, the x-axis, the y-axis, and the z-axis are perpendicular to each other, but the embodiments are not limited thereto. That is, the x-axis, the y-axis, and the z-axis may intersect each other obliquely. In the following description, the x-axis direction will be referred to as a "first direction", the y-axis direction will be referred to as a "second direction", and the z-axis direction will be referred to as a "third direction" for convenience of description. The first, second, and third directions may be perpendicular to each other, or may intersect each other obliquely.

A fuel cell, to which a cell-monitoring connector 300A, 300B, 300C, or 300D for a fuel cell according to the embodiment is connected, may be, for example, a polymer electrolyte membrane fuel cell (or a proton exchange membrane fuel cell) (PEMFC), which has been studied most extensively as a power source for driving vehicles. However, the embodiments are not limited to any specific type of fuel cell.

The fuel cell may include end plates (pressing plates or compression plates) (not shown) and a cell stack (not shown).

Hereinafter, an example of the fuel cell, to which a cell-monitoring connector 300A, 300B, 300C, or 300D for a fuel cell according to the embodiment is detachably mounted, will be described with reference to FIG. 1. However, the cell-monitoring connector 300A, 300B, 300C, or 300D for a fuel cell according to the embodiment may be applied without being limited as to the specific type of fuel cell.

FIG. 1 is a cross-sectional view of the end plates and the cell stack of the fuel cell.

The cell stack 122 may include a plurality of unit cells 122-1 to 122-N, which are stacked in the first direction. Here, "N" is a positive integer of 1 or greater, and may range from several tens to several hundreds. However, the embodiments are not limited to any specific value of "N".

Each unit cell 122-n may generate electric power having a predetermined voltage. Here, 1≤n≤N. "N" may be determined depending on the intensity of the power to be supplied from the fuel cell to a load. Here, the term "load" refers to a part of a vehicle that requires power when the fuel cell is used in the vehicle.

Each unit cell 122-n may include a membrane electrode assembly (MEA) 210, gas diffusion layers (GDLs) 222 and 224, gaskets 232, 234, and 236, and separators (or bipolar plates) 242 and 244.

The membrane electrode assembly 210 has a structure in which catalyst electrode layers, in which electrochemical reaction occurs, are attached to both sides of an electrolyte membrane through which hydrogen ions move. Specifically, the membrane electrode assembly 210 may include a polymer electrolyte membrane (or a proton exchange membrane) 212, a fuel electrode (a hydrogen electrode or an anode) 214, and an air electrode (an oxygen electrode or a cathode) 216. In addition, the membrane electrode assembly 210 may further include a sub-gasket 238.

The polymer electrolyte membrane 212 is disposed between the fuel electrode 214 and the air electrode 216.

Hydrogen, which is the fuel in the fuel cell, may be supplied to the fuel electrode 214 through the first separator 242, and air containing oxygen as an oxidizer may be supplied to the air electrode 216 through the second separator 244.

The hydrogen supplied to the fuel electrode 214 is decomposed into hydrogen ions (protons) (H+) and electrons (e−) by the catalyst. Only the hydrogen ions may be selectively transferred to the air electrode 216 through the polymer electrolyte membrane 212, and at the same time, the electrons may be transferred to the air electrode 216 through the separators 242 and 244, which are conductors. In order to realize the above operation, a catalyst layer may be applied to each of the fuel electrode 214 and the air electrode 216. The movement of the electrons described above causes the electrons to flow through an external wire, thus generating current. That is, the fuel cell may generate power due to the electrochemical reaction between hydrogen, which is fuel, and oxygen contained in the air.

In the air electrode 216, the hydrogen ions supplied through the polymer electrolyte membrane 212 and the electrons transferred through the separators 242 and 244 meet oxygen in the air supplied to the air electrode 216, thus causing a reaction that generates water ("condensate water" or "product water").

In some cases, the fuel electrode 214 may be referred to as an anode, and the air electrode 216 may be referred to as a cathode. Alternatively, the fuel electrode 214 may be referred to as a cathode, and the air electrode 216 may be referred to as an anode.

The gas diffusion layers 222 and 224 serve to uniformly distribute hydrogen and oxygen, which are reaction gases, and to transfer the generated electric energy. To this end, the gas diffusion layers 222 and 224 may be disposed on respective sides of the membrane electrode assembly 210. That is, the first gas diffusion layer 222 may be disposed on the left side of the fuel electrode 214, and the second gas diffusion layer 224 may be disposed on the right side of the air electrode 216.

The first gas diffusion layer 222 may serve to diffuse and uniformly distribute hydrogen supplied as a reactant gas through the first separator 242, and may be electrically conductive. The second gas diffusion layer 224 may serve to diffuse and uniformly distribute air supplied as a reactant gas through the second separator 244, and may be electrically conductive.

Each of the first and second gas diffusion layers 222 and 224 may be a microporous layer in which fine carbon fibers are combined. However, the embodiments are not limited to any specific configuration of the first and second gas diffusion layers 222 and 224.

The gaskets 232, 234, and 236 may serve to maintain airtightness and clamping pressure of the cell stack at an appropriate level with respect to the reactant gases and the coolant, to disperse the stress when the separators 242 and 244 are stacked, and to independently seal the flow paths. As such, since airtightness and watertightness are maintained by the gaskets 232, 234, and 236, the flatness of the surfaces that are adjacent to the cell stack 122, which generates power, may be secured, and thus surface pressure may be distributed uniformly over the reaction surface of the cell stack 122. To this end, the gaskets 232, 234, and 236 may be formed of rubber. However, the embodiments are not limited to any specific material of the gaskets.

The separators 242 and 244 may serve to move the reactant gases and the cooling medium and to separate each of the unit cells from the other unit cells. In addition, the separators 242 and 244 may serve to structurally support the membrane electrode assembly 210 and the gas diffusion layers 222 and 224 and to collect the generated current and transfer the collected current to current collectors 112.

The separators 242 and 244 may be disposed outside the gas diffusion layers 222 and 224, respectively. That is, the first separator 242 may be disposed on the left side of the first gas diffusion layer 222, and the second separator 244 may be disposed on the right side of the second gas diffusion layer 224.

The first separator 242 serves to supply hydrogen as a reactant gas to the fuel electrode 214 through the first gas diffusion layer 222. The second separator 244 serves to supply air as a reactant gas to the air electrode 216 through the second gas diffusion layer 224. In addition, each of the first and second separators 242 and 244 may form a channel through which a cooling medium (e.g. coolant) may flow. Further, the separators 242 and 244 may be formed of a graphite-based material, a composite graphite-based material, or a metal-based material. However, the embodiments are not limited to any specific material of the separators 242 and 244.

The end plates 110A and 110B shown in FIG. 1 may be disposed at the respective ends of the cell stack 122, and may support and fix the unit cells 122. That is, the first end plate 110A may be disposed at one end of the cell stack 122, and the second end plate 110B may be disposed at the opposite end of the cell stack 122.

Each of the end plates 110A and 110B may be configured such that a metal insert is surrounded by a plastic injection-molded product. The metal insert of each of the end plates 110A and 110B may have high rigidity to withstand internal surface pressure, and may be formed by machining a metal material. For example, each of the end plates 110A and 110B may be formed by combining a plurality of plates. However, the embodiments are not limited to any specific configuration of the end plates 110A and 110B.

The current collectors 112 may be disposed between the cell stack 122 and the inner surfaces 110AI and 110BI of the end plates 110A and 110B that face the cell stack 122. The current collectors 112 serve to collect the electric energy generated by the flow of electrons in the cell stack 122 and to supply the electric energy to a load that uses the fuel cell.

Further, the first end plate 110A may include a plurality of manifolds (or communicating portions) M. Each of the first and second separators 242 and 244 shown in FIG. 1 may include manifolds that are formed in the same shape at the same positions as the manifolds of the first end plate 110A. Here, the manifolds may include an inlet manifold and an outlet manifold. Hydrogen and oxygen, which are reactant gases necessary in the membrane electrode assembly 210, may be introduced from the outside into the cell stack 122 through the inlet manifold. Gas or liquid, in which the reactant gases humidified and supplied to the cell and the condensate water generated in the cell are combined, may be discharged to the outside of the fuel cell through the outlet manifold. The cooling medium may flow from the outside into the cell stack 122 through the inlet manifold and may flow from the cell stack 122 to the outside through the outlet manifold. As described above, the manifolds allow the fluid to flow into and out of the membrane electrode assembly 210.

In order to determine the performance and failure of the cell stack 122, the separators 242 and 244 of each cell may be connected to a control circuit via a cell-monitoring connector 300A, 300B, 300C, or 300D and a wire so as to measure the voltage of each cell. Here, the control circuit refers to a circuit including a measurement device and an electronic control unit for operating the fuel cell in a vehicle.

Hereinafter, cell-monitoring connectors 300A, 300B, 300C, and 300D for fuel cells according to the embodiments for checking the state (e.g. the voltage) of each of the unit cells included in the fuel cell will be described with reference to the accompanying drawings.

First, a cell-monitoring connector 300A for a fuel cell (hereinafter referred to as a "cell-monitoring connector") according to an embodiment will be described.

Figure 2A:
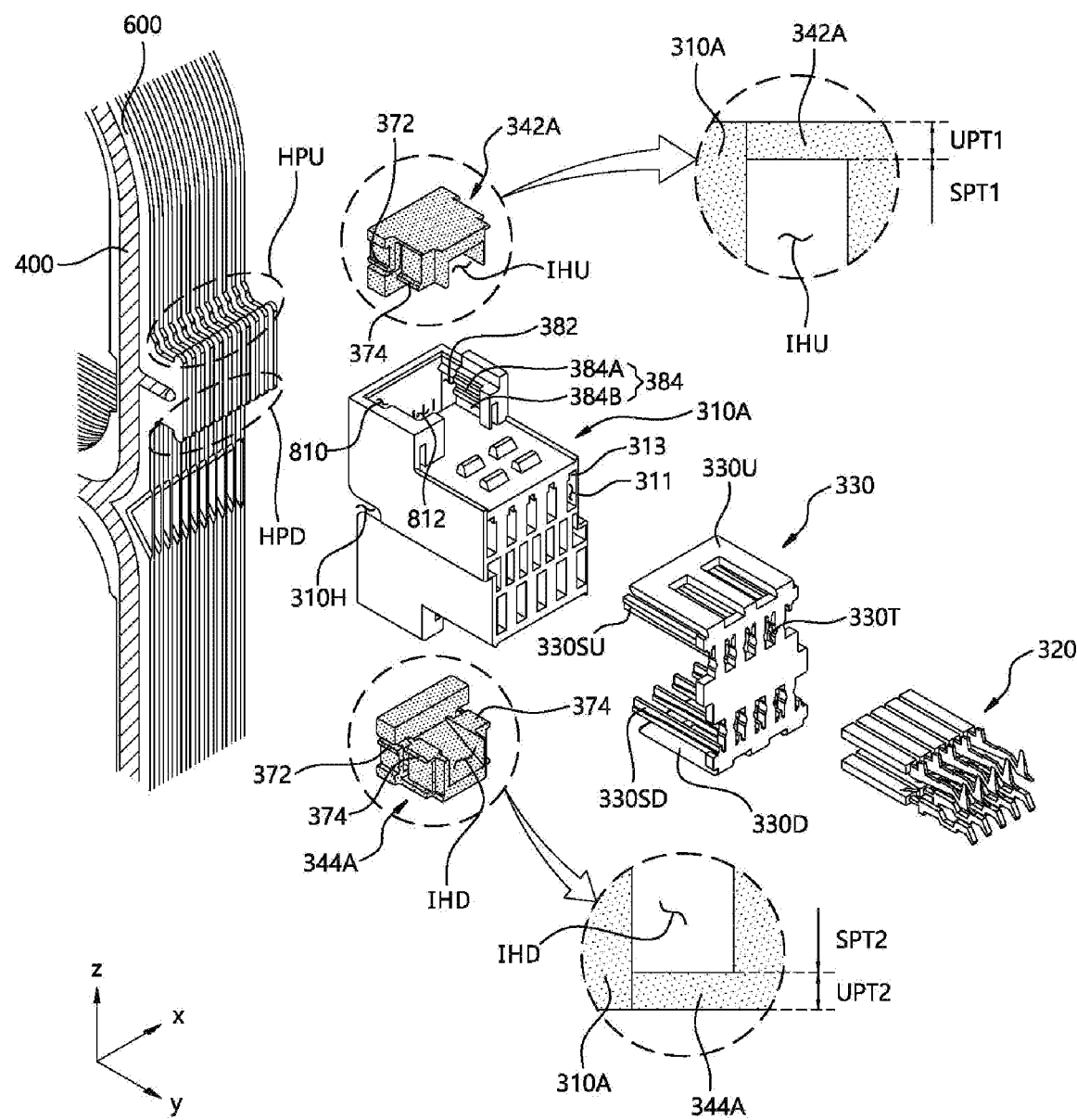
FIG. 2A is a front exploded perspective view of a cell-monitoring connector and separators of a fuel cell according to an embodiment when viewed from the right.
Figure 2B:
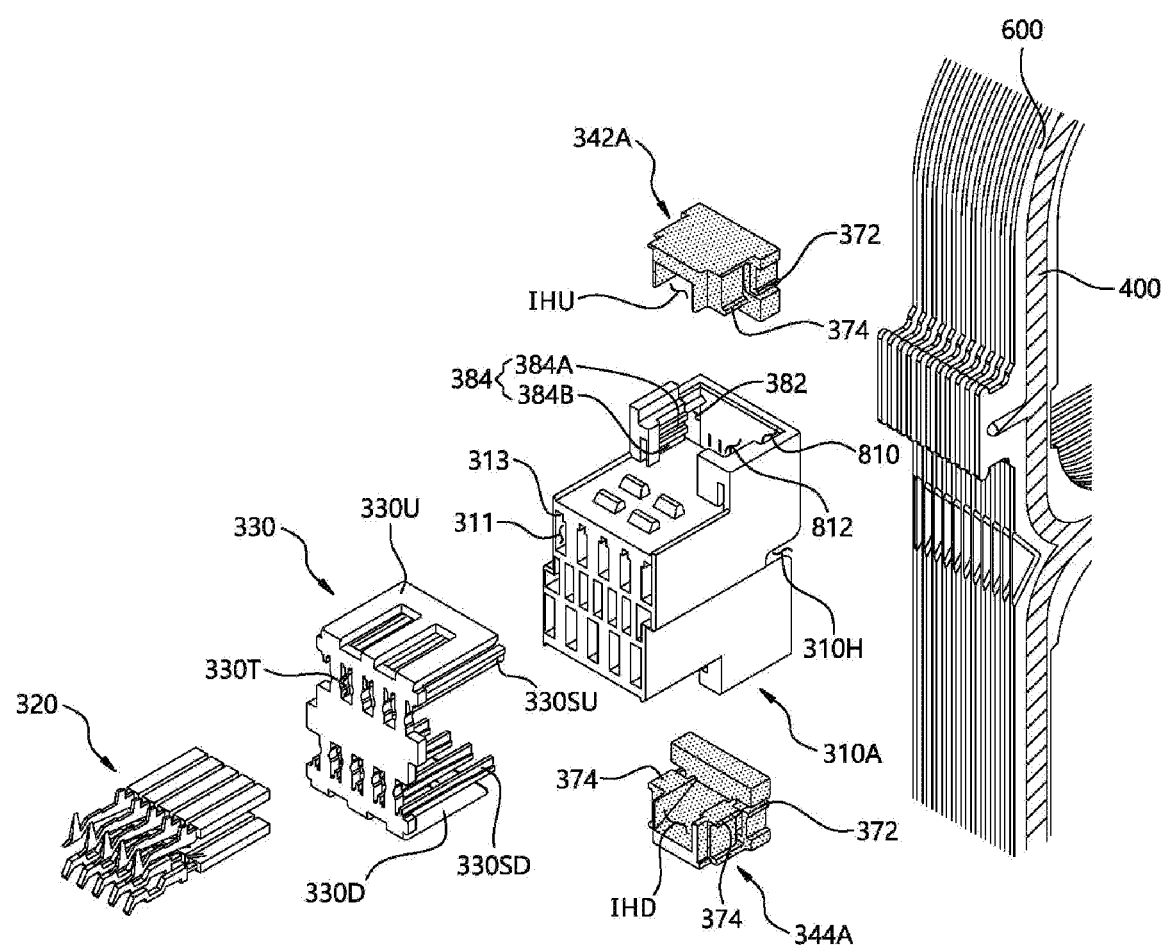
FIG. 2B is a front exploded perspective view of the cell-monitoring connector and the separators of the fuel cell according to the embodiment when viewed from the left.
Figure 3:
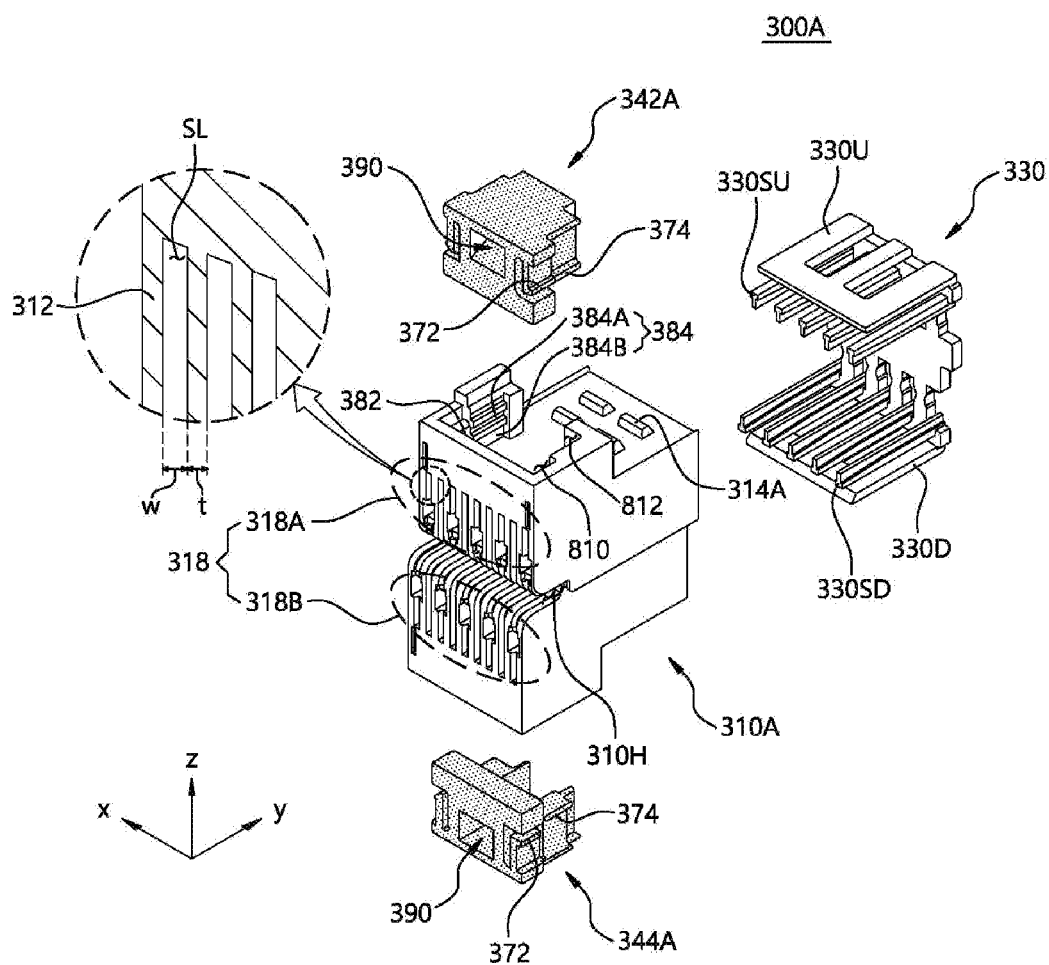
FIG. 3 is a rear exploded perspective view of an embodiment of the cell-monitoring connector shown in FIGS. 2A and 2B.
Figure 4:
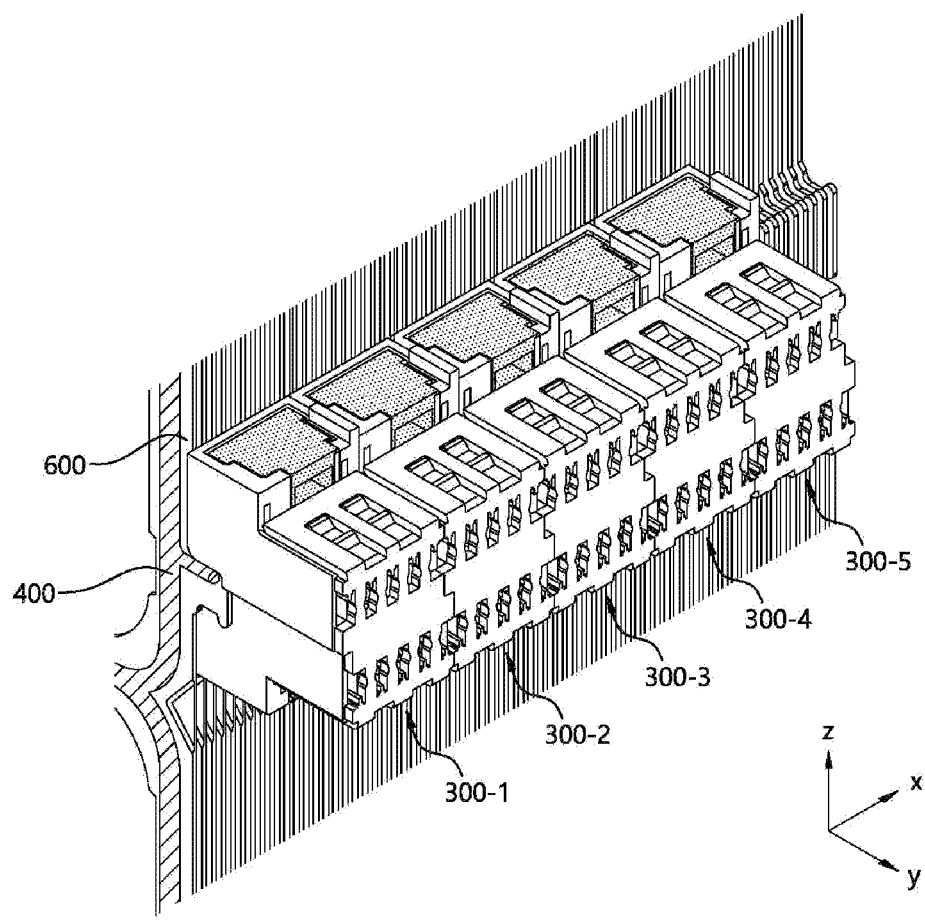
FIG. 4 is a front perspective view showing the state in which a plurality of cell-monitoring connectors according to the embodiment is coupled to the separators.
Figure 5:
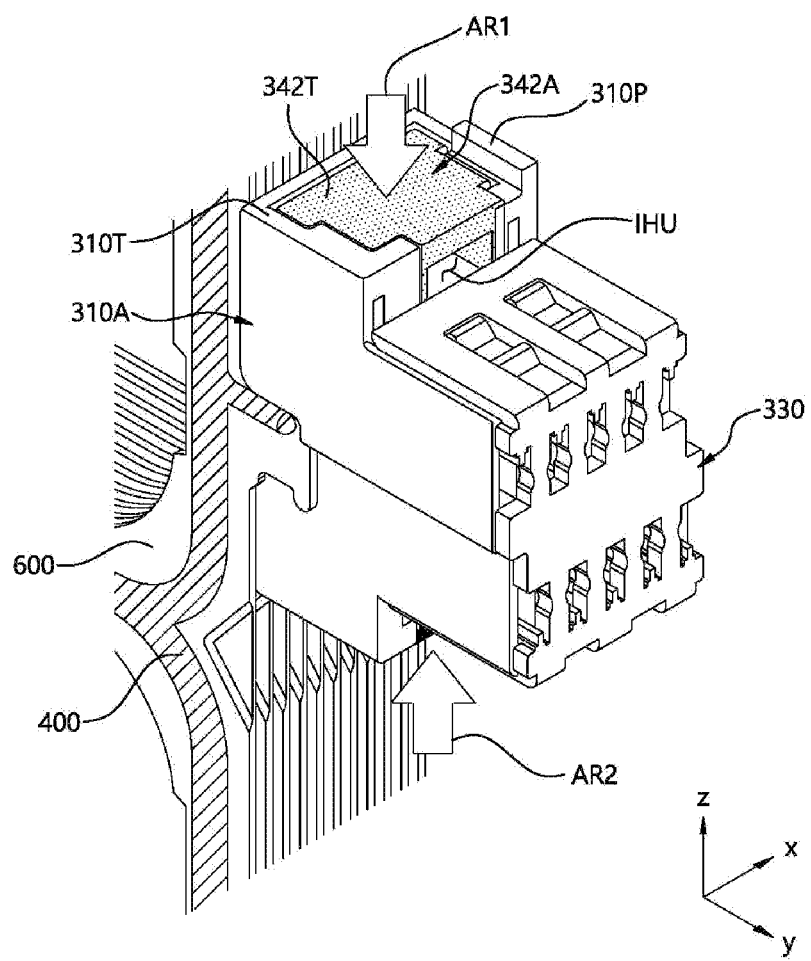
FIG. 5 is a front coupled perspective view of an embodiment of the cell-monitoring connector shown in FIG. 2A.
Figure 6:
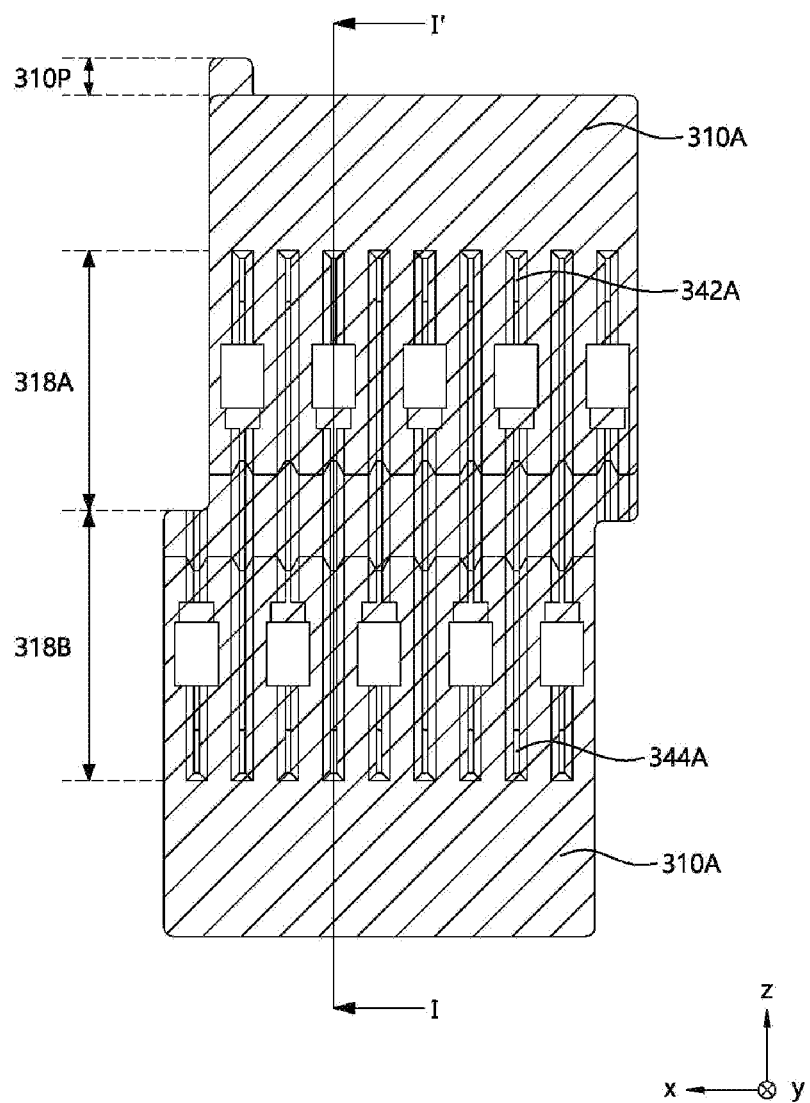
FIG. 6 is a rear view of an embodiment of the cell-monitoring connector according to the embodiment shown in FIG. 5.
Figure 7A:
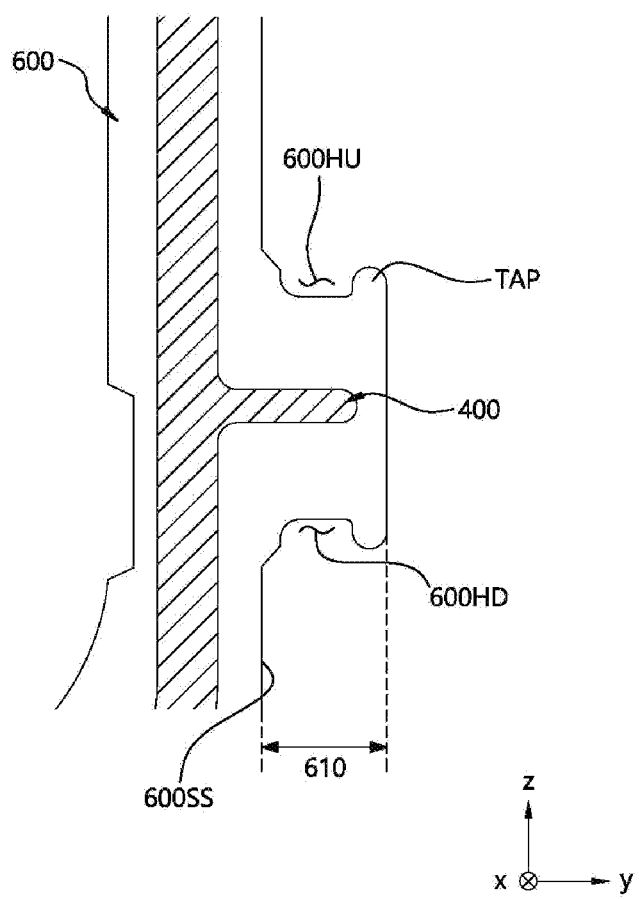
FIG. 7A is a side view of an embodiment of the separators and the gasket shown in FIGS. 2A, 2B, 4, and 5.
Figure 7B:
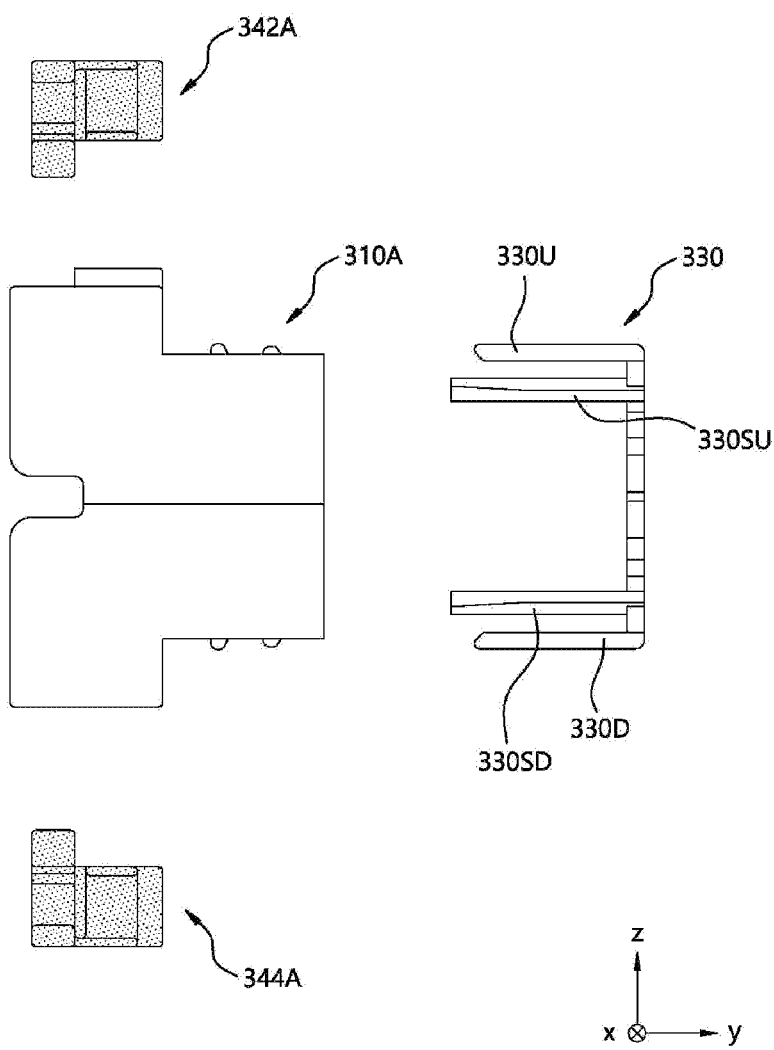
FIG. 7B is an exploded side view of an embodiment of the cell-monitoring connector shown in FIG. 3.
Figure 7C:
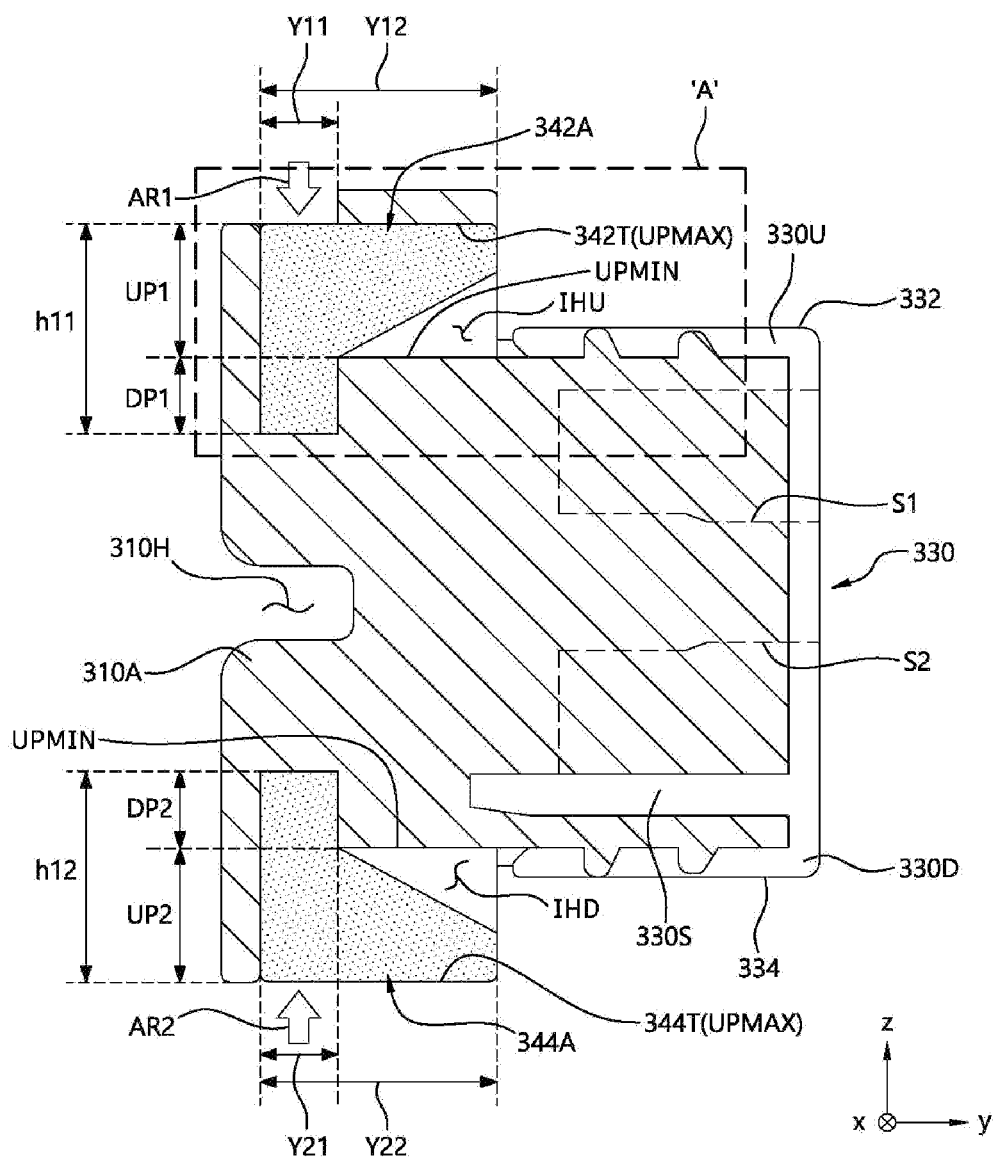
FIG. 7C is a coupled side-sectional view of an embodiment of the cell-monitoring connector shown in FIG. 3.

FIG. 2A is a front exploded perspective view of a cell-monitoring connector 300A and separators 600 of a fuel cell according to an embodiment when viewed from the right, and FIG. 2B is a front exploded perspective view of the cell-monitoring connector 300A and the separators 600 of the fuel cell according to the embodiment when viewed from the left. FIG. 3 is a rear exploded perspective view of the cell-monitoring connector 300A shown in FIGS. 2A and 2B. FIG. 4 is a front perspective view showing the state in which a plurality of cell-monitoring connectors 300A (300-1 to 300-5) according to the embodiment is coupled to the separators 600. FIG. 5 is a front coupled perspective view of an embodiment of the cell-monitoring connector 300A shown in FIG. 2A. FIG. 6 is a rear view of the cell-monitoring connector 300A according to the embodiment shown in FIG. 5. FIG. 7A is a side view of the separators 600 and the gasket 400 shown in FIGS. 2A, 2B, 4, and 5. FIG. 7B is an exploded side view of the cell-monitoring connector 300A shown in FIG. 3, and FIG. 7C is a coupled side-sectional view of the cell-monitoring connector 300A shown in FIG. 3.

For better understanding, illustration of the connection terminal 320 shown in FIGS. 2A and 2B is omitted from FIGS. 3 to 7C. For convenience of description, among the components of the fuel cell to which the cell-monitoring connector 300A according to the embodiment is mounted, only the separators 600 and the gasket 400 are illustrated. The separators 600 and the gasket 400, to which the cell-monitoring connector 300A according to the embodiment is connected, are merely given by way of example to aid in understanding the cell-monitoring connector 300A, and may have any of various configurations. Further, components of the fuel cell, other than the separators 600 and the gasket 400, may also be embodied in any of various configurations, and the embodiments are not limited to any specific configuration of the components of the fuel cell.

The separators 600 may correspond to the separators 242 and 244 shown in FIG. 1, and the gasket 400 may correspond to the gaskets 232, 234, and 236 shown in FIG. 1. Alternatively, the gasket 400 may be a separate gasket diverging from the gaskets 232, 234, and 236 shown in FIG. 1.

As the unit cells 122-1 to 122-N are stacked in the first direction, as shown in FIGS. 2A, 2B, 4, and 5, the separators 600 may be disposed so as to be spaced apart from each other in the first direction.

As shown in FIG. 7A, each of the separators 600 may include a terminal 610 protruding from a side thereof in the second direction. Here, the second direction is a direction in which the terminal 610 protrudes from the side portion 600SS of the separator 600 toward the cell-monitoring connector 300A. The cell-monitoring connector 300A may be coupled to a tab TAB formed at an end of the terminal 610.

The separators 600 included in the cell stack 122 may be parts of all separators included in the fuel cell. For example, all separators included in the fuel cell may be grouped into unit groups, and each unit group may include a plurality of separators 600. For example, FIG. 4 illustrates the separators 600 grouped into five unit groups. The cell-monitoring connectors 300-1, 300-2, 300-3, 300-4, and 300-5 may be mounted to respective unit groups. The cell-monitoring connectors 300-1, 300-2, 300-3, 300-4, and 300-5 may have the same configuration, and may perform the same operation. For example, each unit group may include ten separators 600, and the cell-monitoring connector 300A shown in FIG. 5 may be mounted to each of the unit groups of the fuel cell.

A recess (hereinafter referred to as a "lock recess") may be formed in at least one of the upper portion or the lower portion of the terminal 610 included in each of the separators 600. For example, as illustrated in FIG. 7A, a lock recess 600HU (hereinafter referred to as a "first lock recess") may be formed in the upper portion of the terminal 610 of each of the separators 600, and a lock recess 600HD (hereinafter referred to as a "second lock recess") may be formed in the lower portion of the terminal 610 of each of the separators 600, but the embodiments are not limited thereto. Hereinafter, the configuration in which both the first lock recess 600HU and the second lock recess 600HD are formed in the terminal 610 will be described. However, the embodiments are not limited thereto.

According to another embodiment, the lock recess 600HU or 600HD may be formed only in one of the upper portion and the lower portion of the terminal 610, and the following description may also apply to this embodiment.

The first and second lock recesses 600HU and 600HD formed in each of the separators 600 belonging to the unit group may be disposed so as to overlap the first and second lock recesses 600HU and 600HD formed in an adjacent separator 600 in the first direction. The first and second lock recesses 600HU and 600HD overlapping in the first direction may define groove portions, which are receiving spaces in which the cell-monitoring connector 300A is mounted. For example, referring to FIG. 2A, the first lock recesses 600HU overlapping in the first direction may define a first groove portion HPU, which is a receiving space in which the cell-monitoring connector 300A is mounted, and the second lock recesses 600HD overlapping in the first direction may define a second groove portion HPD, which is a receiving space in which the cell-monitoring connector 300A is mounted. That is, the first groove portion HPU may be formed by arrangement of the first lock recesses 600HU formed in the upper portions of the terminals 61o, and the second groove portion HPD may be formed by arrangement of the second lock recesses 600HD formed in the lower portions of the terminals 610.

Figure 8A:
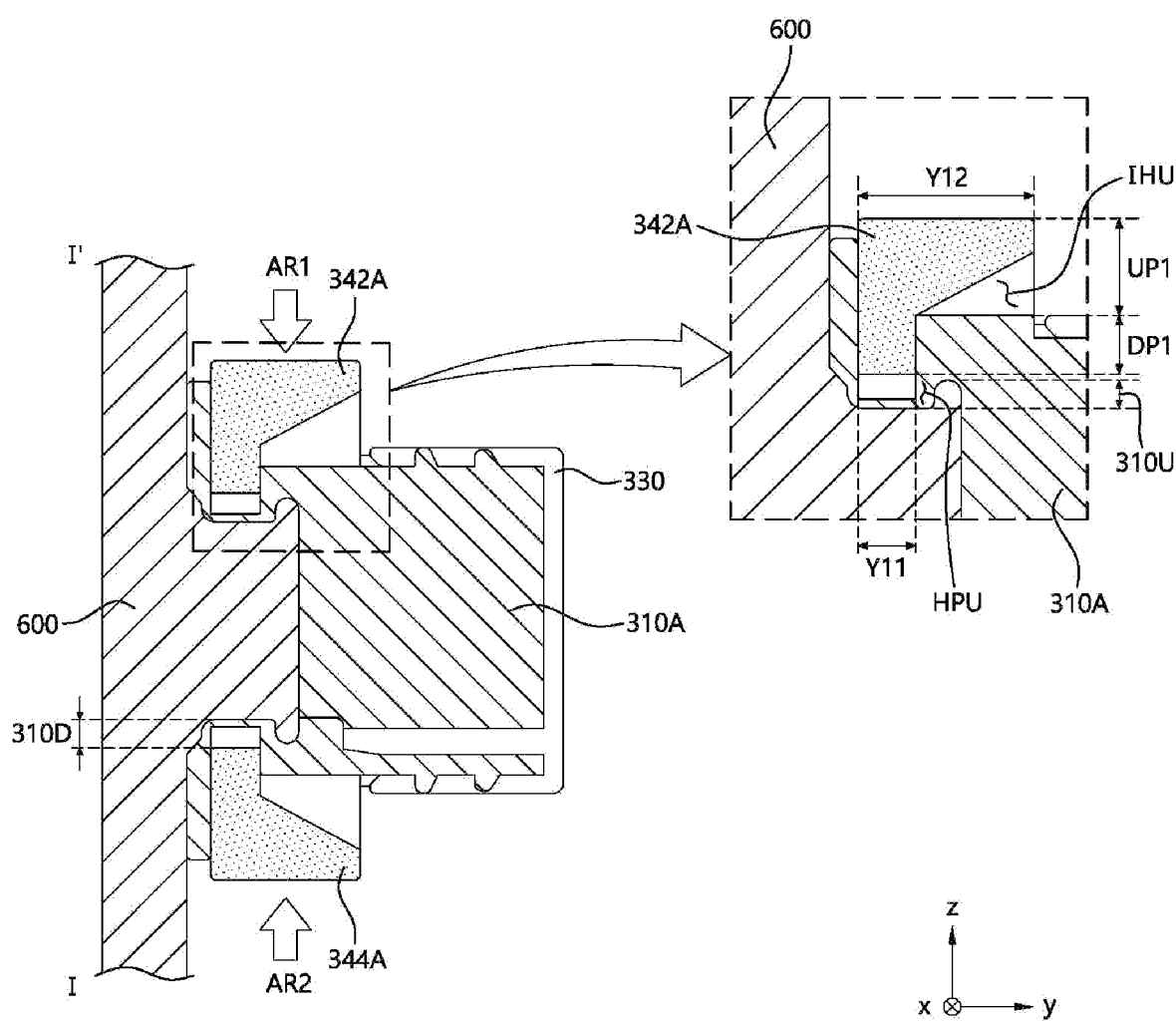
FIGS. 8A and 8B are side-sectional views taken along line I-I' in the cell-monitoring connector shown in FIG. 6.
Figure 8B:
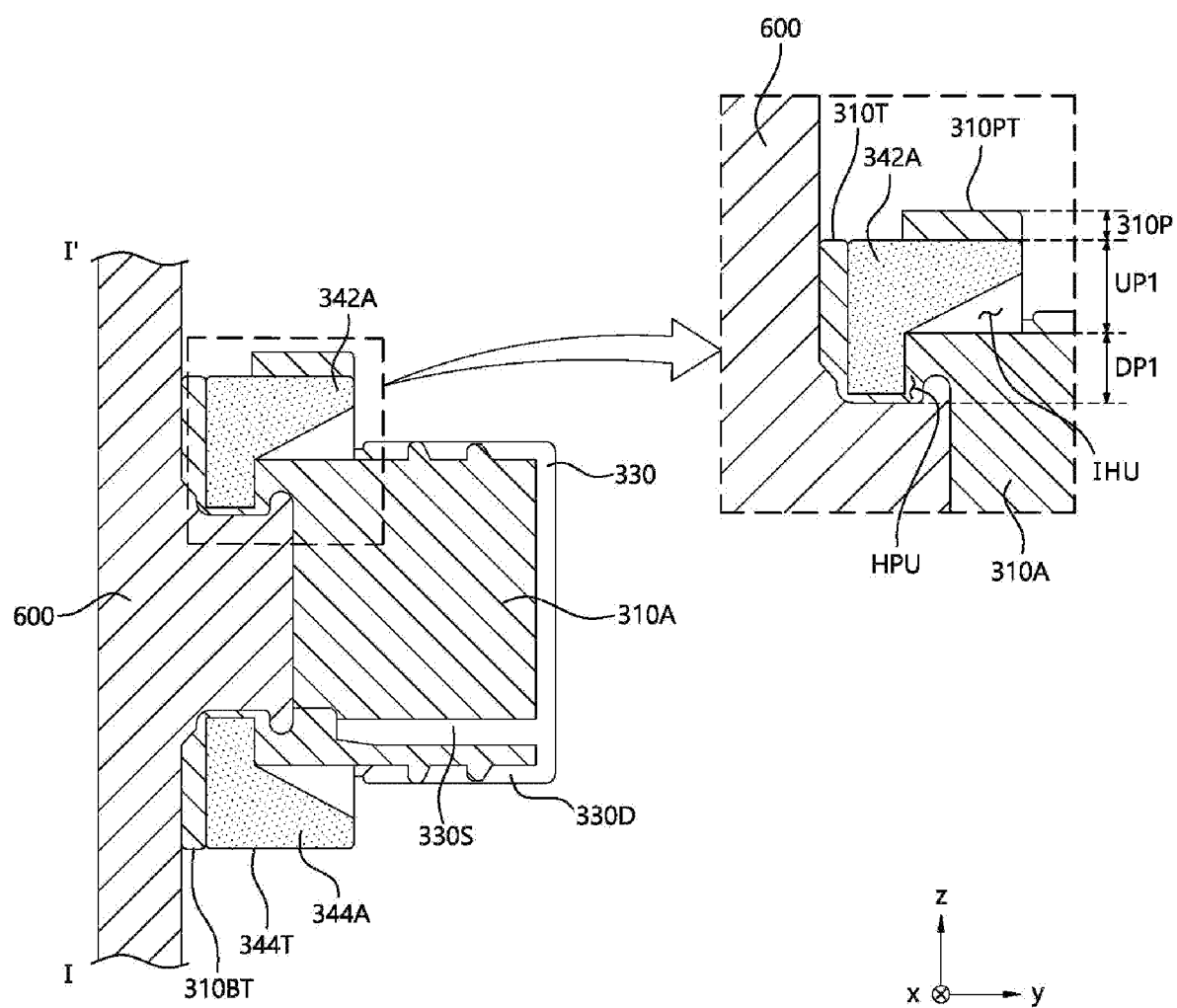

FIGS. 8A and 8B are side-sectional views taken along line I-I' in the cell-monitoring connector 300A shown in FIG. 6.

The cell-monitoring connector 300A according to the embodiment may be configured so as to be detachably mounted to the fuel cell. For example, the cell-monitoring connector 300A may include a housing 310A, a connection terminal 320, a terminal position assurance (TPA) 330, and connector position assurances (CPAs) 342A and 344A. In this case, the cell-monitoring connector 300A according to the embodiment is not limited to any specific shape of the connection terminal 320 or the TPA 330.

Referring to FIG. 8A, the housing 310A may include a lock portion 310U (hereinafter referred to as a "first lock portion"), formed corresponding to the first groove portion HPU, and a lock portion 310D (hereinafter referred to as a "second lock portion"), formed corresponding to the second groove portion HPD. That is, the first lock portion 310U may correspond to the portion of the housing 310A that is received in the first groove portion HPU, and the second lock portion 310D may correspond to the portion of the housing 310A that is received in the second groove portion HPD. The first and second lock portions 310U and 310D may have shapes suitable for being received in the first and second groove portions HPU and HPD, respectively.

Also, referring to FIG. 3, the housing 310A may include first and second slit portions 318 (318A and 318B) formed in the rear surface thereof. Each of the first and second slit portions 318 (318A and 318B) may include a plurality of first slits SL. The housing 310A may include partition walls 312, and each of the first slits SL may be located in a space between adjacent ones of the partition walls 312. When the first and second lock parts 310U and 310D of the housing 310A are respectively received in the first and second groove portions HPU and HPD in the separators 600, the terminals 610 of the separators 600 may be fitted into the first slits SL of the first and second slit portions 318A and 318B.

In addition, referring to FIGS. 2A and 2B, the housing 310A may include connection terminal insertion holes 311 formed in the front surface thereof. The connection terminal insertion holes 311 may communicate with the first slits SL formed in the rear surface of the housing 310A. The housing 310A may further include TPA terminal insertion holes 313 formed in the upper portions of the connection terminal insertion holes 311.

In addition, the housing 310A may include a shift-preventing groove 310H disposed between the first and second slit portions 318A and 318B. If the shift-preventing groove 310H is omitted, although not shown, the first and second slit portions 318A and 318B may be formed separately from each other in the third direction. One of the first and second slit portions 318A and 318B may include first slits SL into which the terminals 610 of the odd-numbered (or even-numbered) separators among the plurality of separators 600 are fitted, and the other one of the first and second slit portions 318A and 318B may include first slits SL into which the terminals 610 of the even-numbered (or odd-numbered) separators among the plurality of separators 600 are fitted. As such, when adjacent ones of the separators 600 are alternately fitted into the first slits SL of the two different slit portions 318A and 318B, the sizes of gaps in the first direction between adjacent ones of the separators 600 may be reduced.

In general, each of the separators 600 that are adjacent to each other is electrically conductive. The partition walls 312, which are electrically insulative, serve to electrically isolate the terminals 610 of the separators 600, which are fitted into the respective first slits SL, from each other, thereby preventing the occurrence of short-circuit between adjacent ones of the separators 600.

Further, when the partition walls 312 have the same thickness t in the first direction and the first slits SL have the same width w in the first direction, the separators 600 may be arranged at regular intervals in the first direction, and accordingly, stacking tolerances of the separators 600 in the first direction may be compensated. As such, since the separators 600 included in the cell stack 122 are accurately aligned, the first and second lock recesses 600HU and 600HD, which form the first and second groove portions HPU and HPD, may be prevented from being misaligned, thereby making it possible to easily assemble the cell-monitoring connector 300A to the separators 600.

After the cell-monitoring connector 300A is mounted to the separators 600, the CPAs may be selectively inserted into the lock portions of the housing 310A in the third direction from at least one of the upper end or the lower end of the cell-monitoring connector 300A and may be locked in the groove portions.

For example, as illustrated, in the case in which the first and second groove portions HPU and HPD are respectively formed in the upper and lower portions of the terminals 610, the CPAs may include the first and second CPAs 342A and 344A.

After the cell-monitoring connector 300A is mounted to the separators 600, the first CPA 342A may be selectively inserted into the first lock portion 310U of the housing 310A from the upper end of the cell-monitoring connector 300A in the third direction (e.g. the −z-axis direction, which is the direction of the arrow AR1 shown in FIG. 8A), and may be locked in the first groove portion HPU. Also, after the cell-monitoring connector 300A is mounted to the separators 600, the second CPA 344A may be selectively inserted into the second lock portion 310D of the housing 310A from the lower end of the cell-monitoring connector 300A in the third direction (e.g. the +z-axis direction, which is the direction of the arrow AR2 shown in FIG. 8A), and may be locked in the second groove portion HPD.

In this way, since the first and second CPAs 342A and 344A are respectively locked in the first and second groove portions HPU and HPD, the housing 310A may be secured to the separators 600, thereby preventing the cell-monitoring connector 300A from being separated from the separators 600 in the second direction due to external vibration and impact. As described above, each of the first and second CPAs 342A and 344A is a kind of locking device, and may be made of plastic.

Hereinafter, the CPA will be described as including both the first CPA 342A and the second CPA 344A. However, the following description may also apply to the case in which the CPA includes only one of the first and second CPAs 342A and 344A.

Each of the first and second CPAs 342A and 344A may include a lower portion and an upper portion.

That is, referring to FIGS. 7C and 8A, a lower portion DP1 of the first CPA 324A (hereinafter referred to as a "first lower portion") may be inserted into the first lock portion 310U of the housing 310A in the third direction (e.g. the direction of the arrow AR1) and may be locked in the first groove portion HPU, and an upper portion UP1 of the first CPA 324A (hereinafter referred to as a "first upper portion") may extend from the first lower portion DP1 in the third direction (e.g. the +z-axis direction).

According to the embodiment, the first upper portion UP1 may include a top surface 342T (hereinafter referred to as a "first top surface"), which has a larger area than the first lower portion DP1 in a direction intersecting the third direction (e.g. at least one of the first direction or the second direction). If the first lower portion DP1 and the first upper portion UP1 have the same length in the first direction, the length Y12 of the first upper portion UP1 in the second direction may be longer than the length Y11 of the first lower portion DP1 in the second direction.

Similar to the first CPA 342A, a lower portion DP2 of the second CPA 344A (hereinafter referred to as a "second lower portion") may be inserted into the second lock portion 310D of the housing 310A in the third direction (e.g. the direction of the arrow AR2) and may be locked in the second groove portion HPD, and an upper portion UP2 of the second CPA 344A (hereinafter referred to as a "second upper portion") may extend from the second lower portion DP2 in the third direction (e.g. the −z-axis direction).

According to the embodiment, the second upper portion UP2 may include a top surface 344T (hereinafter referred to as a "second top surface"), which has a larger area than the second lower portion DP2 in a direction intersecting the third direction (e.g. at least one of the first direction or the second direction). If the second lower portion DP2 and the second upper portion UP2 have the same length in the first direction, the length Y22 of the second upper portion UP2 in the second direction may be longer than the length Y21 of the second lower portion DP2 in the second direction.

Figure 9A:
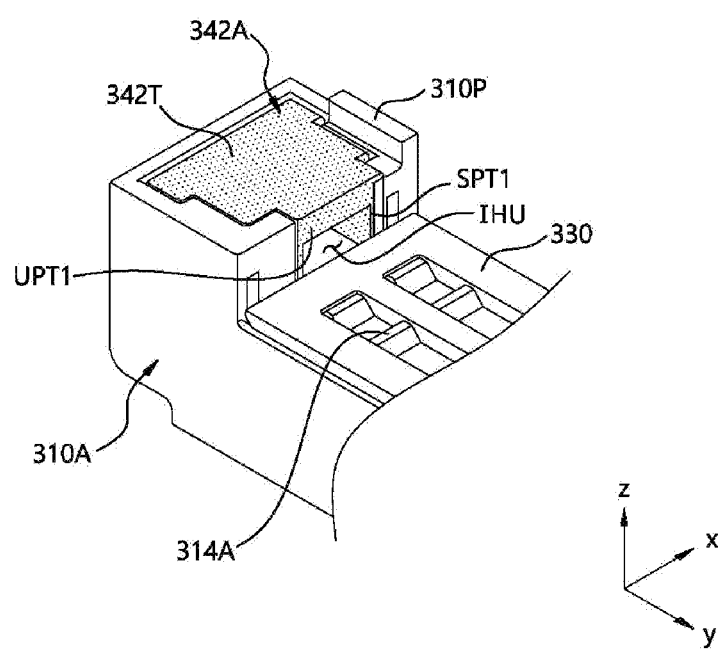
FIG. 9A is a top coupled perspective view of portion "A" shown in FIG. 7C.
Figure 9B:
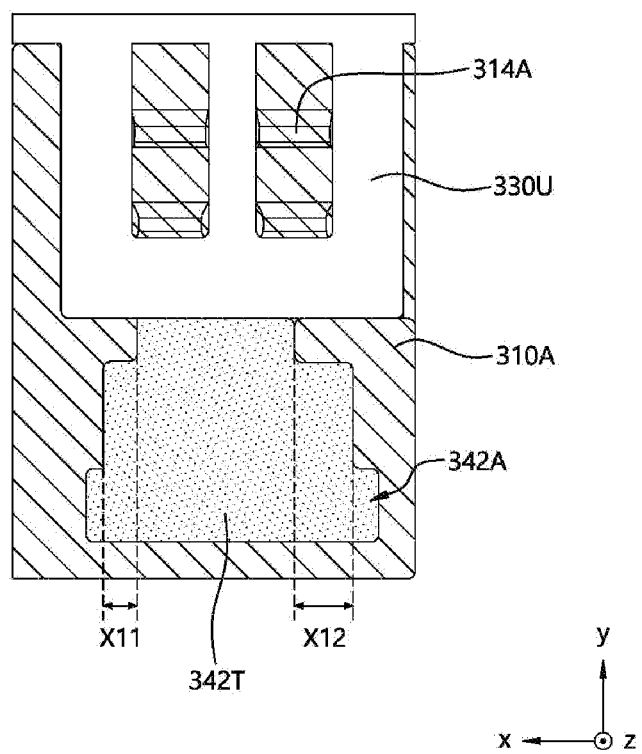
FIG. 9B is a plan view of the embodiment shown in FIG. 7C.
Figure 9C:
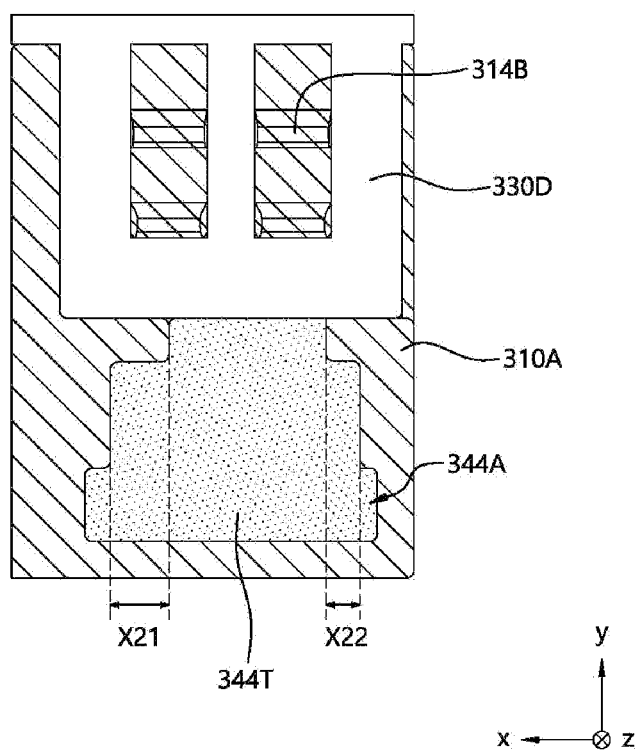
FIG. 9C is a bottom view of the embodiment shown in FIG. 7C.

FIG. 9A is a top coupled perspective view of portion "A" shown in FIG. 7C, FIG. 9B is a plan view of FIG. 7C, and FIG. 9C is a bottom view of FIG. 7C.

According to the embodiment, the first and second top surfaces 342T and 344T of the first and second upper portions UP1 and UP2 may have any of various planar shapes. For example, the first and second top surfaces 342T and 344T may have a rectangular planar shape, or may have a polygonal planar shape, as shown in FIGS. 9A to 9C.

Alternatively, the first and second top surfaces 342T and 344T may have mutually different shapes. The reason for this is to distinguish the first top surface 342T and the second top surface 344T from each other. For example, the length X11 of one side of the first top surface 342T in the first direction shown in FIG. 9B may be shorter than the length X21 of one side of the second top surface 344T in the first direction shown in FIG. 9C, and the length X12 of the opposite side of the first top surface 342T in the first direction shown in FIG. 9B may be longer than the length X22 of the opposite side of the second top surface 344T in the first direction shown in FIG. 9C. Alternatively, unlike what is illustrated in the drawings, the length X11 may be longer than the length X21, and the length X12 may be shorter than the length X22.

As such, since the first and second top surfaces 342T and 344T have mutually different planar shapes, it is possible to prevent erroneous assembly, for example, insertion of the second CPA 344A into the space for receiving the first CPA 342A or insertion of the first CPA 342A into the space for receiving the second CPA 344A.

The first top surface 342T corresponds to a press-fit surface that is pressed when the first CPA 342A is inserted into the first lock portion 310U in the third direction (e.g. the direction of the arrow AR1 shown in FIGS. 8A and 8B), and the second top surface 344T corresponds to a press-fit surface that is pressed when the second CPA 344A is inserted into the second lock portion 310D in the third direction (e.g. the direction of the arrow AR2 shown in FIGS. 8A and 8B). For example, the first and second top surfaces 342T and 344T may have appropriate areas and shapes that enable a worker to press the same without using a tool.

In addition, the housing 310A may include a first locking protrusion 314A and a second locking protrusion 314B. As shown in FIGS. 9A and 9B, the first locking protrusion 314A may protrude from the portion of the outer surface of the housing 310A, which is in contact with an upper fixing piece 330U of the TPA 330, in the third direction (e.g. the +z-axis direction). As shown in FIG. 9C, the second locking protrusion 314B may protrude from the portion of the outer surface of the housing 310A, which is in contact with a lower fixing piece 330D of the TPA 330, in the third direction (e.g. the −z-axis direction).

Although it is illustrated in FIG. 9B that the number of the first locking protrusions 314A is four and it is illustrated in FIG. 9C that the number of the second locking protrusions 314B is four, the embodiments are not limited to any specific number of the first locking protrusions 314A or the second locking protrusions 314B.

The TPA 330 may be secured to the housing 310A by engagement of the upper fixing piece 330U with the first locking protrusion 314A and engagement of the lower fixing piece 330D with the second locking protrusion 314B. Accordingly, the first locking protrusion 314A and the second locking protrusion 314B may prevent the TPA 330 from being separated from the housing 310A or undesirably moving in at least one of the first direction or the second direction when the TPA 330 is coupled to the housing 310A.

In addition, according to the embodiment, the housing 310A may further include a protruding portion 310P, which protrudes in the third direction from any one of the end of the housing 310A to which the first CPA 342A is coupled and the opposite end of the housing 310A to which the second CPA 344A is coupled. For example, as shown in FIGS. 5, 6, 8B, and 9A, the protruding portion 310P may protrude in the third direction from the end of the housing 310A to which the first CPA 342A is coupled. As such, since the protruding portion 310P is formed only at one of the two opposite ends of the housing 310A, the end of the housing 310A to which the first CPA 342A is coupled and the opposite end of the housing 310A to which the second CPA 344A is coupled may be distinguished from each other.

Figure 10A:
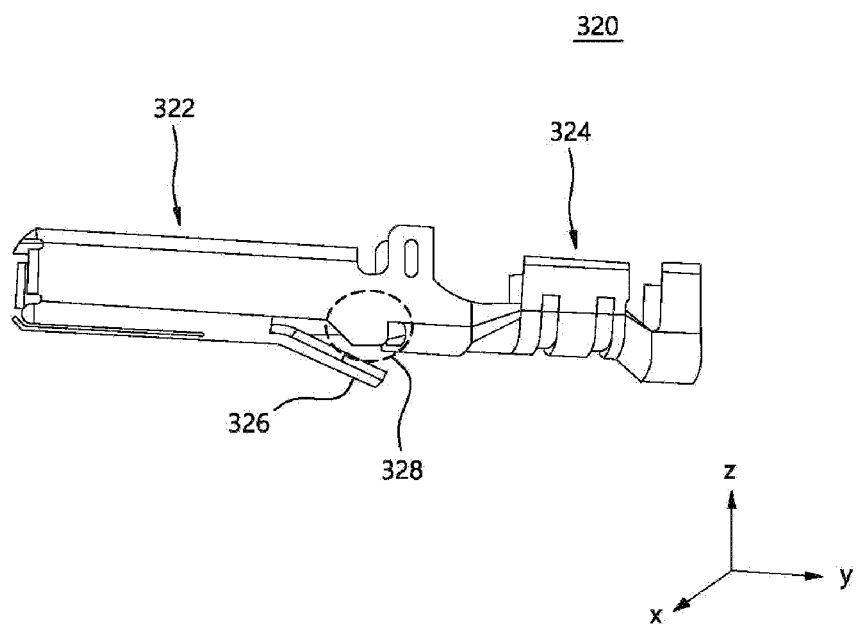
FIGS. 10A and 10B are, respectively, a perspective view and a plan view of a connection terminal according to the embodiment.
Figure 10B:
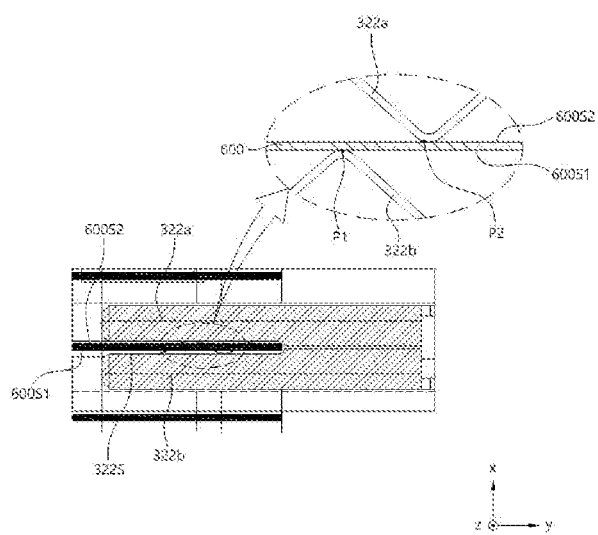

FIGS. 10A and 10B are, respectively, a perspective view and a plan view of the connection terminal 320 according to the embodiment.

The connection terminal 320 may be inserted into each of the connection terminal insertion holes 311 formed in the housing 310A, and may be connected to the terminal 610 of each of the separators 600. To this end, referring to FIG. 7C, the housing 310A and the TPA 330 may include first and second accommodation portions S1 and S2 in which the connection terminal 320 is accommodated.

For example, referring to FIG. 10A, the connection terminal 320 may include a terminal connection portion 322 and a wire-holding portion 324. The terminal connection portion 322 is inserted into a corresponding connection terminal insertion hole 311 to be connected to a corresponding separator 600. The wire-holding portion 324 extends from the terminal connection portion 322 to be surrounded by a wire (an electric wire) to hold the same.

Referring to FIG. 10B, the terminal connection portion 322 may include connection pieces 322a and 322b, which flexibly spread and contact opposite surfaces 600S1 and 600S2 of the separator 600. The connection points P1 and P2 of the connection pieces 322a and 322b may be disposed so as to be offset from each other. As such, according to the embodiment, since the connection points P1 and P2 of the connection pieces 322a and 322b are offset from each other, when the separator 600 is inserted into a second slit 322S defined by the two connection pieces 322a and 322b, the contact force between the separator 600 and the connection pieces 322a and 322b may increase, and the separator 600 may be supported more flexibly. Thus, even when the separator 600 is implemented as an ultra-thin film having a thickness of 0.1 mm or less, the connection terminal 320 may be prevented from being unintentionally separated from the separator 600. That is, the force of holding the connection terminal 320 to the separator 600 may increase, which results in improved product reliability.

The terminal connection portion 322 of the connection terminal 320 may have a rectangular parallelepiped shape having an opening formed in the front side thereof, but the embodiments are not limited thereto.

In addition, the connection terminal 320 may further include a third locking protrusion 326. The third locking protrusion 326 may protrude from the lower surface of the terminal connection portion 322 toward the wire-holding portion 324. The third locking protrusion 326 may have a shape that is bent and extends downwards from the lower surface of the terminal connection portion 322.

In addition, the connection terminal 320 may further include a connection guide portion 328. The connection guide portion 328 may prevent the connection terminal 320, connected to the separator 600 through the housing 310, from being separated from the separator 600.

The TPA 330 may be detachably fitted into the TPA terminal insertion holes 313 formed in the front side of the housing 310A, and may cause the connection terminals 320 to be press-fitted into the housing 310A. That is, the TPA 330 may increase the insertion force of the connection terminals 320, may prevent erroneous assembly by correctly positioning the connection terminals 320, and may make it possible to continuously sense the voltage value with high reliability in spite of the narrow pitch between the separators 600. To this end, the TPA terminal insertion holes 313 may be formed in the upper portions of the connection terminal insertion holes 311 in the housing 310A.

In addition, the TPA 330 may include fixing pieces formed so as to be engaged with the first and second locking protrusions 314A and 314B. For example, referring to FIGS. 2A, 2B, 3, and 7C, the TPA 330 may include an upper fixing piece 330U and a lower fixing piece 330D. As illustrated in FIGS. 9A and 9B, the upper fixing piece 330U of the TPA 330 may be engaged with the first locking protrusion 314A formed at the housing 310A. As illustrated in FIG. 9C, the lower fixing piece 330D of the TPA 330 may be engaged with the second locking protrusion 314B formed at the housing 310A.

In addition, the TPA 330 may have through-holes 330T formed therein so as to correspond to the connection terminal insertion holes 311 formed in the housing 310A, and may further include TPA terminals 330SU and 330SD formed so as to be inserted into the TPA terminal insertion holes 313.

When the TPA 330 is assembled to the housing 310A, the TPA 330 is placed directly in front of the housing 310A, and is then moved in the second direction so that the upper fixing piece 330U of the TPA 330 is locked to the first locking protrusion 314A and the lower fixing piece 330D of the TPA 330 is locked to the second locking protrusion 314B.

Further, the connection terminal 320 is inserted into a corresponding through-hole 330T in the TPA 330 and a corresponding connection terminal insertion hole 311 in the housing 310A. At this time, the third locking protrusion 326 shown in FIG. 10A is caught in the housing 310A, thereby preventing the connection terminal 320 from being separated from the housing 310A by external vibration or impact, thus ensuring connection between the connection terminal 320 and the separator 600.

Next, cell-monitoring connectors 300B, 300C, and 300D for fuel cells according to other embodiments will be described.

Figure 11A:
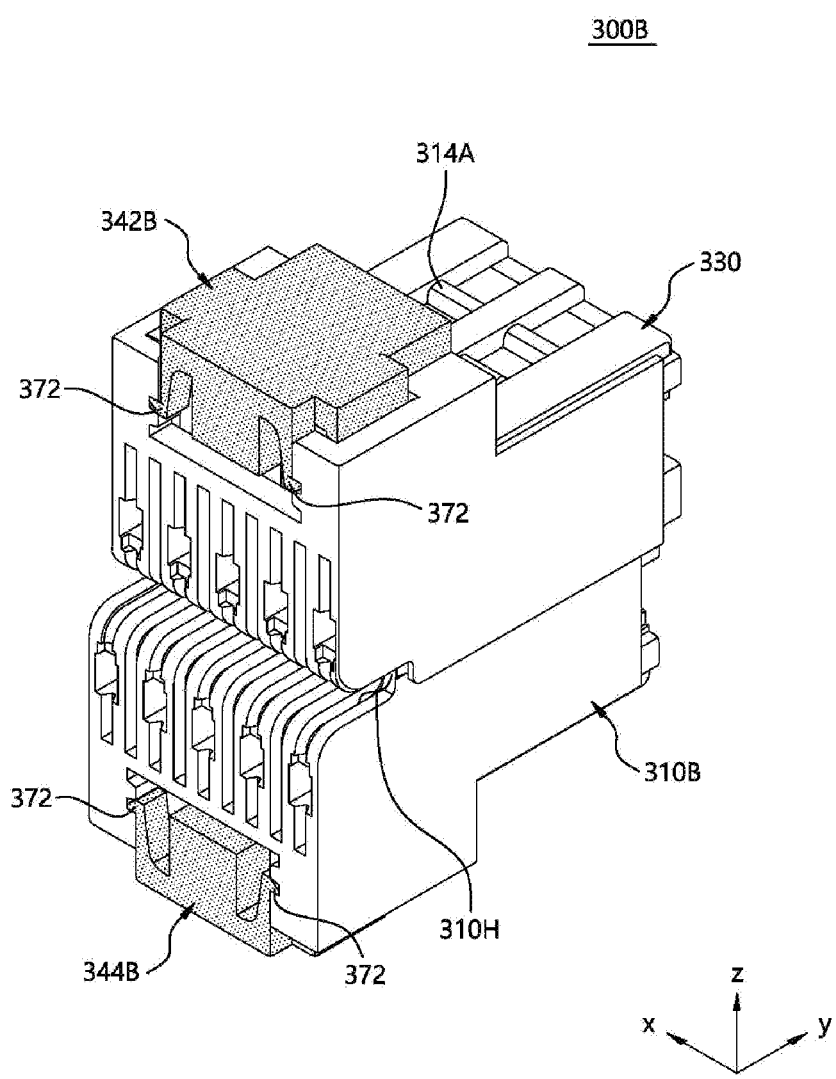
FIGS. 11A and 11B are, respectively, a coupled perspective view and an exploded perspective view of a cell-monitoring connector according to another embodiment.
Figure 11B:
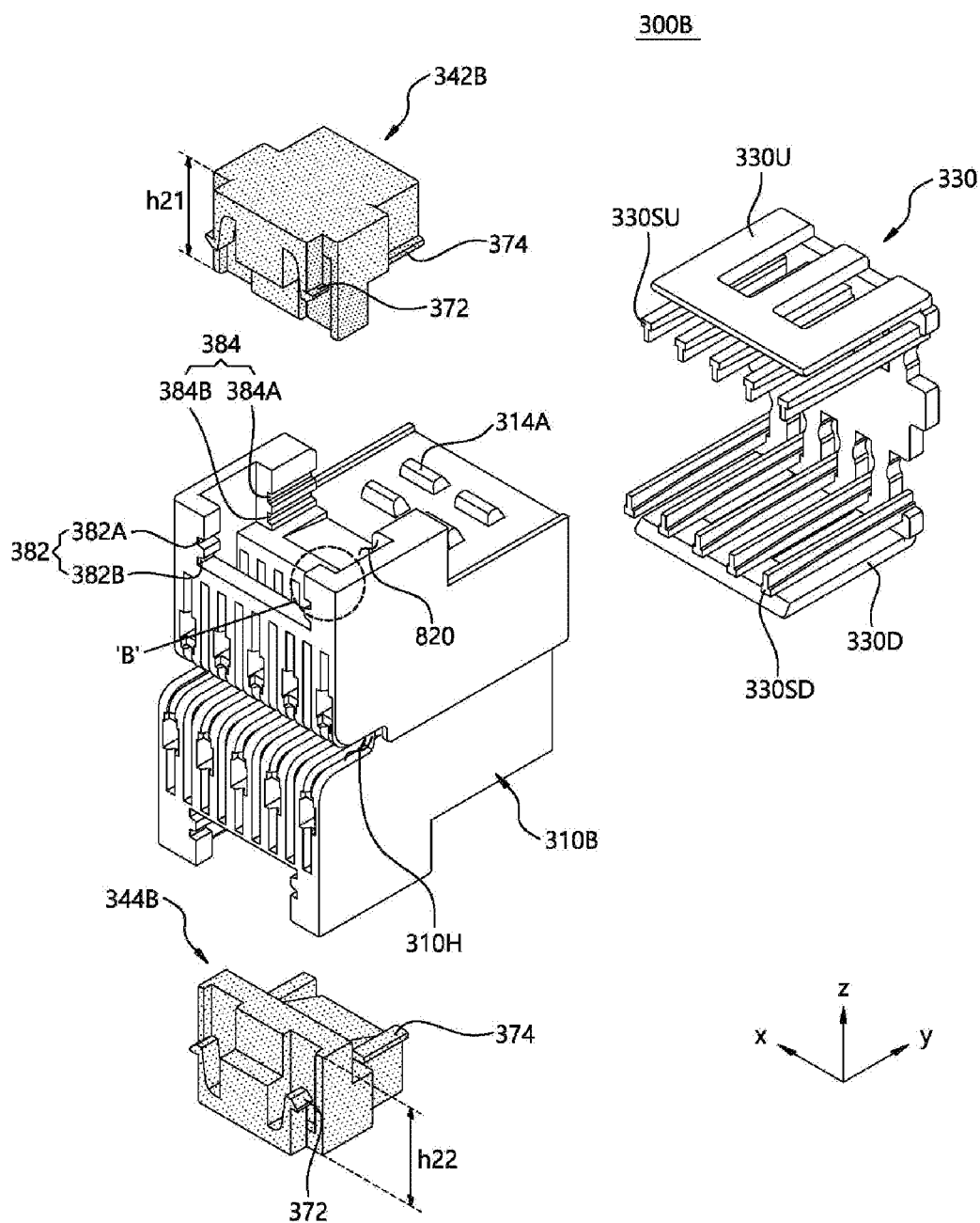

FIGS. 11A and 11B are, respectively, a coupled perspective view and an exploded perspective view of a cell-monitoring connector 300B according to another embodiment.

Figure 12A:
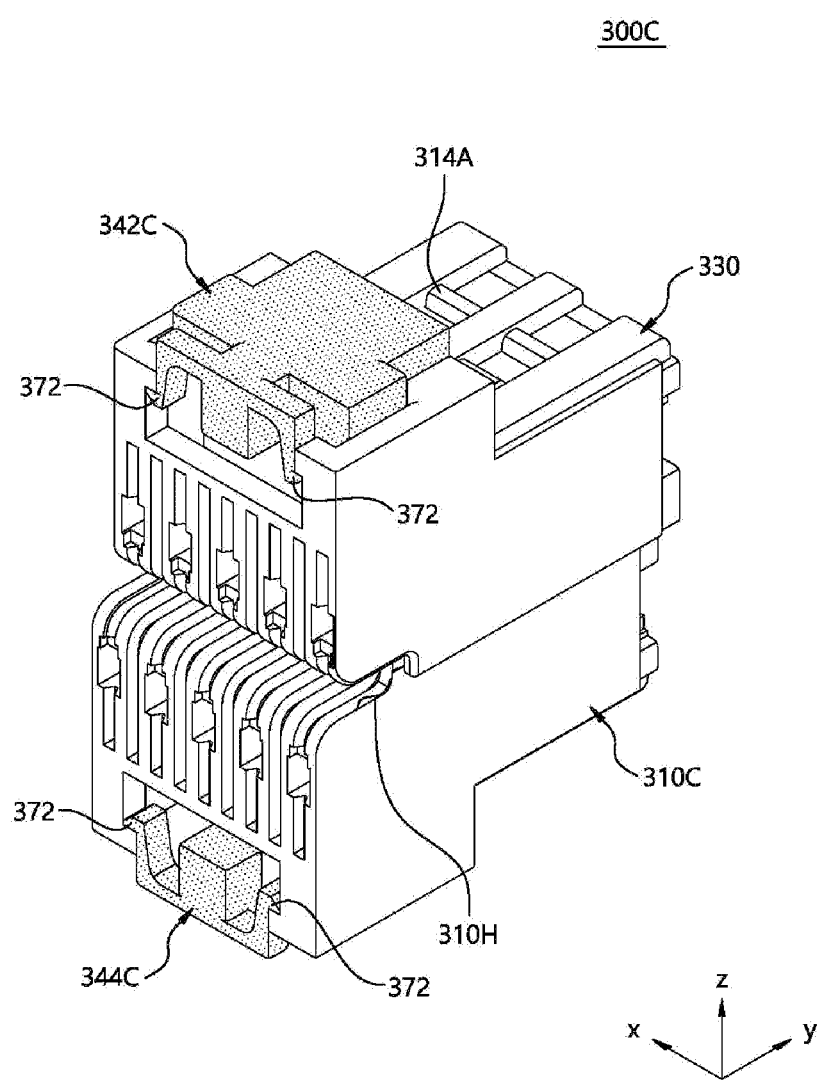
FIGS. 12A and 12B are, respectively, a coupled perspective view and an exploded perspective view of a cell-monitoring connector according to still another embodiment.
Figure 12B:
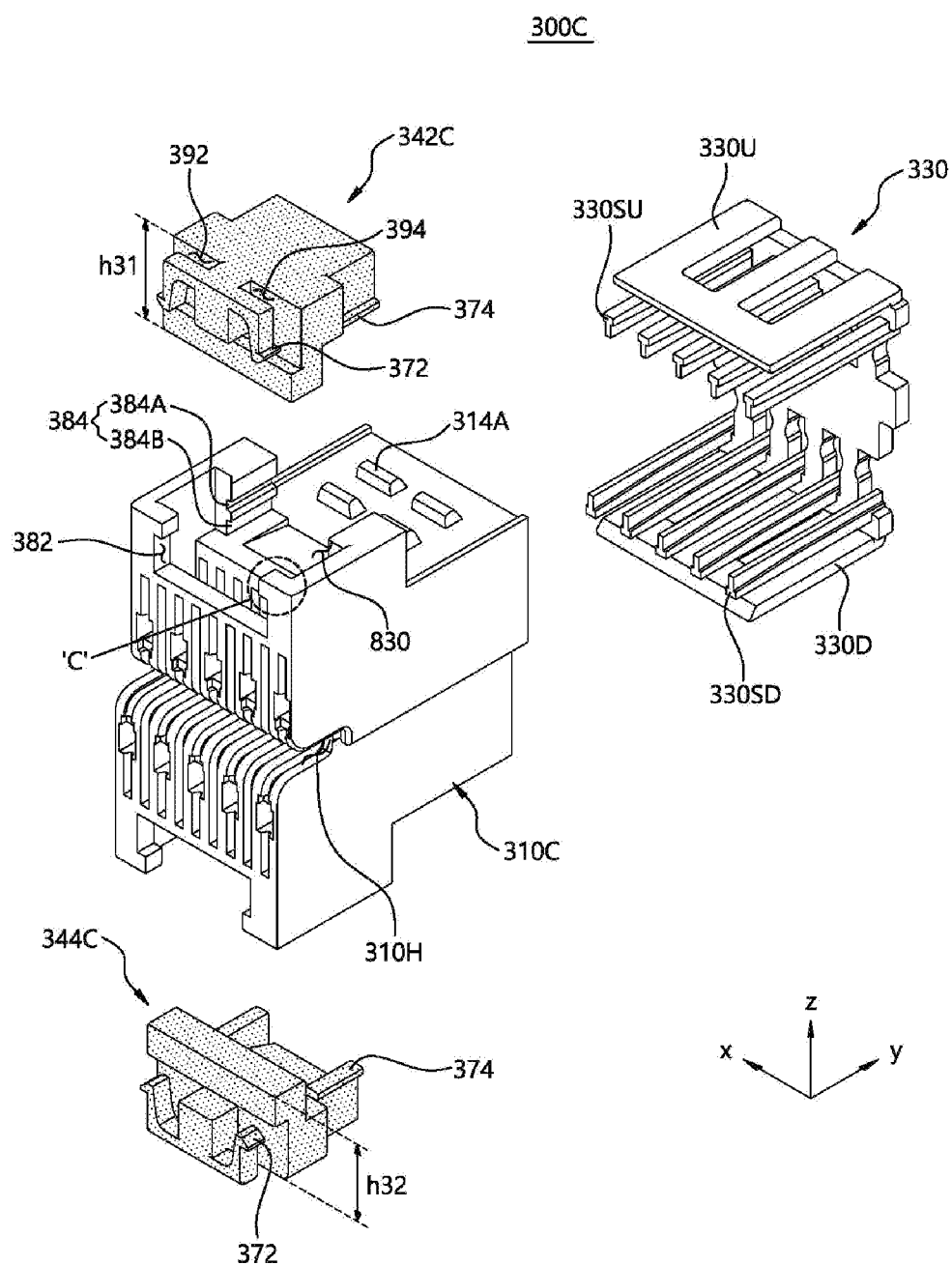

FIGS. 12A and 12B are, respectively, a coupled perspective view and an exploded perspective view of a cell-monitoring connector 300C according to still another embodiment.

Figure 13A:
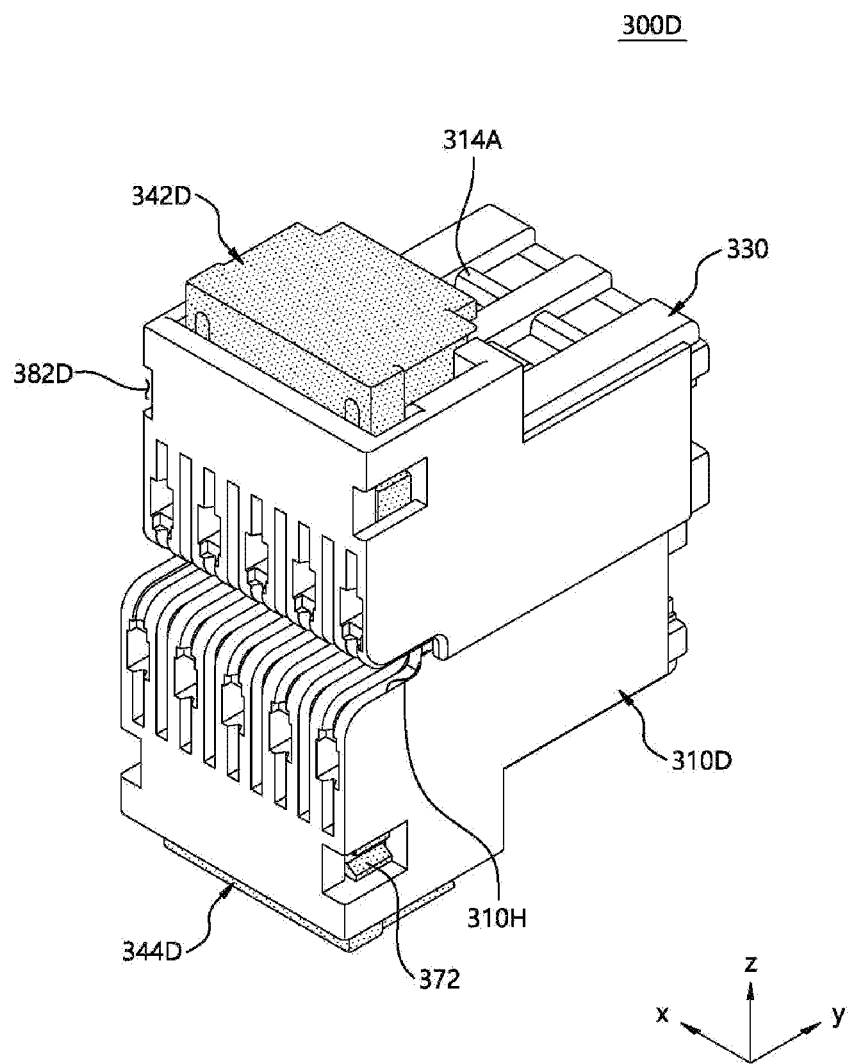
FIGS. 13A and 13B are, respectively, a coupled perspective view and an exploded perspective view of a cell-monitoring connector according to still another embodiment.
Figure 13B:
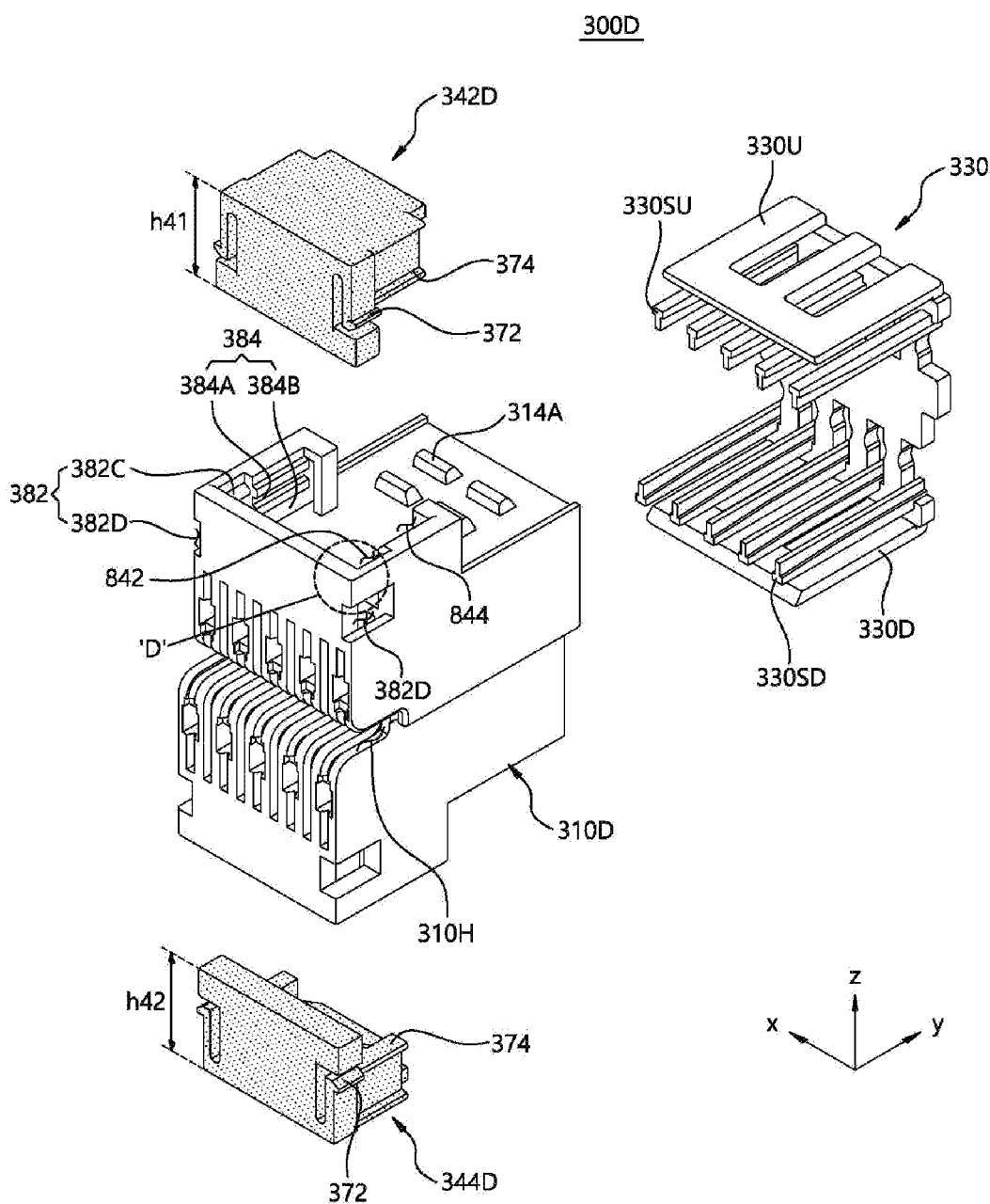

FIGS. 13A and 13B are, respectively, a coupled perspective view and an exploded perspective view of a cell-monitoring connector 300D according to still another embodiment.

The cell-monitoring connector 300B shown in FIGS. 11A and 11B may include a housing 310B, a connection terminal (not shown), a TPA 330, and first and second CPAs 342B and 344B.

The cell-monitoring connector 300C shown in FIGS. 12A and 12B may include a housing 310C, a connection terminal (not shown), a TPA 330, and first and second CPAs 342C and 344C.

The cell-monitoring connector 300D shown in FIGS. 13A and 13B may include a housing 310D, a connection terminal (not shown), a TPA 330, and first and second CPAs 342D and 344D.

The housings 310B, 310C, and 310D, the first CPAs 342B, 342C, and 342D, and the second CPAs 344B, 344C, and 344D perform the same functions as the housing 310A, the first CPA 342A, and the second CPA 344A, respectively, and thus a duplicate description thereof will be omitted. However, the housings 310B, 310C, and 310D, the first CPAs 342B, 342C, and 342D, and the second CPAs 344B, 344C, and 344D have shapes different from those of the housing 310A, the first CPA 342A, and the second CPA 344A, respectively. With this exception, each of the cell-monitoring connectors 300B, 300C, and 300D shown in FIGS. 11A to 13B has the same configuration as the cell-monitoring connector 300A according to the embodiment described above, and thus a detailed description of identical content will be omitted. That is, the description of the cell-monitoring connector 300A according to the embodiment described above may be applied to the parts of the cell-monitoring connectors 300B, 300C, and 300D, a description of which is omitted. Therefore, although not illustrated, each of the cell-monitoring connectors 300B, 300C, and 300D may include a connection terminal that has the same shape as the connection terminal 320 of the cell-monitoring connector 300A according to the embodiment described above.

Hereinafter, the first CPAs 342A, 342B, 342C, and 342D of the cell-monitoring connectors 300A, 300B, 300C, and 300D will be described in comparison with each other. The description of the first CPAs 342A, 342B, 342C, and 342D may also be applied to the second CPAs 344A, 344B, 344C, and 344D.

FIGS. 14(a) to 14(d) are, respectively, plan views of the first CPAs 342A, 342B, 342C, and 342D of the cell-monitoring connectors 300A, 300B, 300C, and 300D according to the embodiments.

According to the embodiments, each of the first CPAs 342A, 342B, 342C, and 342D may include a shift-preventing portion, which protrudes in the first direction. The shift-preventing portion serves to prevent each of the first CPAs 342A, 342B, 342C, and 342D from shaking or moving in the second direction.

For example, the first CPA 342A may include at least one shift-preventing portion 710, 712, 714, or 716, which protrudes in the first direction. The first CPA 342B may include shift-preventing portions 720 and 722, which protrude in the first direction. The first CPA 342C may include shift-preventing portions 734 and 736, which protrude in the first direction. The first CPA 342D may include at least one shift-preventing portion 740, 742, 744, or 746, which protrudes in the first direction. The shift-preventing portion corresponds to the above-described press-fit surface.

In this case, each of the housings 310A, 310B, 310C, and 310D may have a shift-preventing-portion-receiving recess formed therein to receive the shift-preventing portion inserted thereinto in the third direction.

For example, as shown in FIG. 2A, the housing 310A may have therein a shift-preventing-portion-receiving recess 810 for receiving the shift-preventing portions 710 and 714 and a shift-preventing-portion-receiving recess 812 for receiving the shift-preventing portions 712 and 716. As shown in FIG. 11B, the housing 310B may have therein a shift-preventing-portion-receiving recess 820 for receiving the shift-preventing portions 720 and 722. As shown in FIG. 12B, the housing 310C may have therein a shift-preventing-portion-receiving recess 830 for receiving the shift-preventing portions 734 and 736. As shown in FIG. 13B, the housing 310D may have therein a shift-preventing-portion-receiving recess 842 for receiving the shift-preventing portions 740 and 744 and a shift-preventing-portion-receiving recess 844 for receiving the shift-preventing portions 742 and 746.

Each of the first and second CPAs may include a plurality of engagement protrusions (or locking portions), and each of the housings 310A to 310D may further have therein a plurality of protrusion-receiving recesses for receiving the engagement protrusions.

The engagement protrusions serve to fix each of the first and second CPAs to the housing, and may be located at various portions of each of the first and second CPAs.

According to the embodiment, some of the engagement protrusions may protrude in the first direction from first opposite outer side surfaces of each of the first and second CPAs, which are located opposite each other in the first direction, and others among the engagement protrusions may protrude in the first direction from second opposite outer side surfaces of each of the first and second CPAs, which are spaced apart from or extend from the first opposite outer side surfaces in the second direction.

The protrusion-receiving recesses may have shapes for receiving the engagement protrusions, and the engagement protrusions may be received in the protrusion-receiving recesses in a slide-fitting manner when pressed in the third direction. The first and second CPAs may be fixedly mounted in the housing by inserting the engagement protrusions into the protrusion-receiving recesses.

For example, each of the first and second CPAs may include first and second engagement protrusions, and each of the housings 310A to 310D may have therein first and second protrusion-receiving recesses for respectively receiving the first and second engagement protrusions. For example, each of the first CPAs 342A, 342B, 342C, and 342D may include first and second engagement protrusions 372 and 374, and each of the housings 310A to 310D may have therein first and second protrusion-receiving recesses 382 and 384 for respectively receiving the first and second engagement protrusions 372 and 374.

In some cases, the first engagement protrusion serves to primarily engage each of the first and second CPAs with the housing, and the second engagement protrusion serves to fix each of the first and second CPAs, which has been primarily engaged with the housing, to the housing.

Figure 14A:
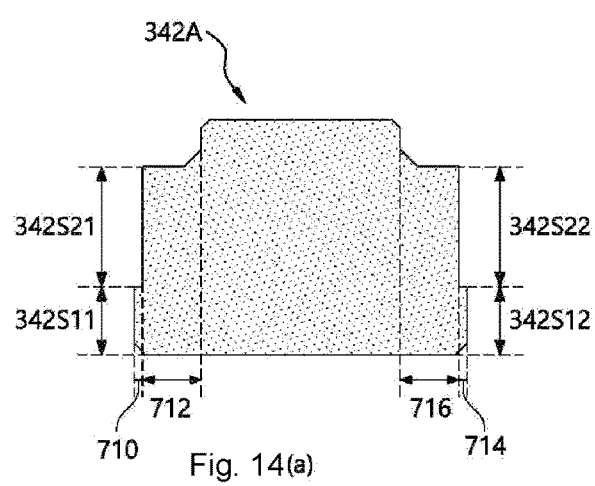
FIGS. 14(a) to 14(d) are, respectively, plan views of first CPAs of the cell-monitoring connectors according to the embodiments.

In the case of the first CPA 342A shown in FIG. 2A, referring to FIG. 14(a), the first engagement protrusion 372 may protrude in the first direction from each of first opposite outer side surfaces 342S11 and 342S12 of the first CPA 342A, which are located opposite each other in the first direction, and the second engagement protrusion 374 may protrude in the first direction from each of second opposite outer side surfaces 342S21 and 342S22 of the first CPA 342A, which are bent and extend from the first opposite outer side surfaces 342S11 and 342S12 in the second direction.

Figure 14B:
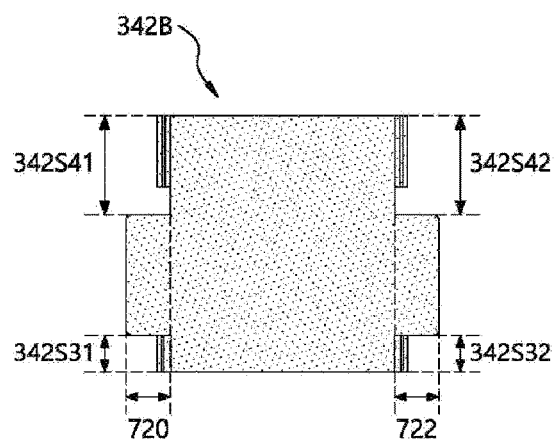

In the case of the first CPA 342B shown in FIG. 11B, referring to FIG. 14(b), the first engagement protrusion 372 may protrude in the first direction from each of first opposite outer side surfaces 342S31 and 342S32 of the first CPA 342B, which are located opposite each other in the first direction, and the second engagement protrusion 374 may protrude in the first direction from each of second opposite outer side surfaces 342S41 and 342S42 of the first CPA 342B, which are spaced apart from the first opposite outer side surfaces 342S31 and 342S32 in the second direction.

Figure 14C:
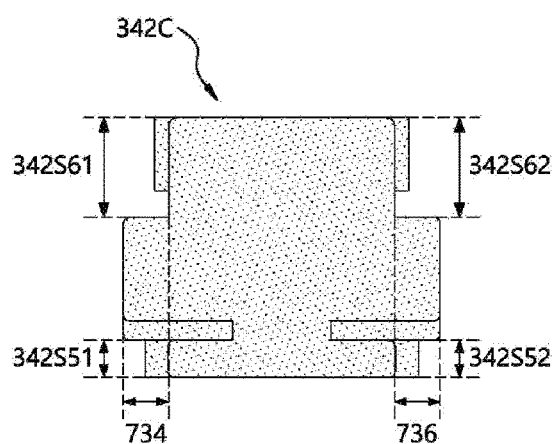

In the case of the first CPA 342C shown in FIG. 12B, referring to FIG. 14(c), the first engagement protrusion 372 may protrude in the first direction from each of first opposite outer side surfaces 342S51 and 342S52 of the first CPA 342C, which are located opposite each other in the first direction, and the second engagement protrusion 374 may protrude in the first direction from each of second opposite outer side surfaces 342S61 and 342S62 of the first CPA 342C, which are spaced apart from the first opposite outer side surfaces 342S51 and 342S52 in the second direction.

Figure 14D:
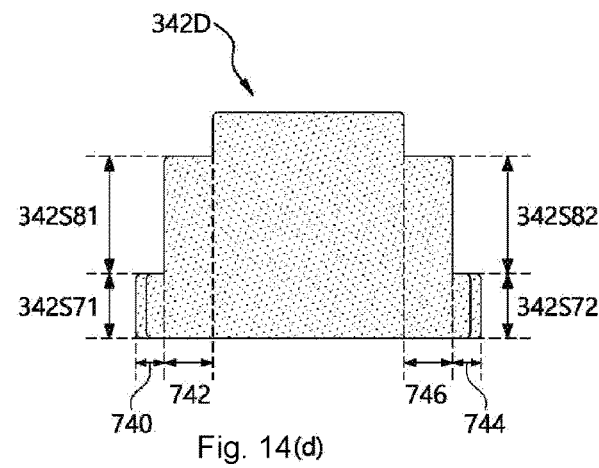

In the case of the first CPA 342D shown in FIG. 13B, referring to FIG. 14(d), the first engagement protrusion 372 may protrude in the first direction from each of first opposite outer side surfaces 342S71 and 342S72 of the first CPA 342D, which are located opposite each other in the first direction, and the second engagement protrusion 374 may protrude in the first direction from each of second opposite outer side surfaces 342S81 and 342S82 of the first CPA 342D, which are bent and extend from the first opposite outer side surfaces 342S71 and 342S72 in the second direction.

As shown in FIGS. 12B and 13B, the first engagement protrusion 372 may have a cantilever shape.

At least one first protrusion-receiving recess 382 and at least one second protrusion-receiving recess 384 may be provided.

For example, as shown in FIG. 2A or 12B, one first protrusion-receiving recess 382 may be provided.

Alternatively, as shown in FIG. 11B, the first protrusion-receiving recess 382 may include two protrusion-receiving recesses, i.e. 1-1st and 1-2nd protrusion-receiving recesses 382A and 382B. The 1-2nd protrusion-receiving recess 382B may be located below the 1-1st protrusion-receiving recess 382A in the third direction. Alternatively, as shown in FIG. 13B, the first protrusion-receiving recess 382 may include 1-3rd and 1-4th protrusion-receiving recesses 382C and 382D. The 1-4th protrusion-receiving recess 382D may be located below the 1-3rd protrusion-receiving recess 382C in the third direction.

As such, when the number of first protrusion-receiving recesses 382 is two, each of the first CPAs 342B and 342D may have a double engagement structure.

The first engagement protrusion 372 may not be exposed to the outside, as shown in FIG. 5, or may be exposed to the outside, as shown in FIG. 11A, 12A, or 13A.

A plurality of second protrusion-receiving recesses may be provided. When two second protrusion-receiving recesses are provided, even if one first protrusion-receiving recess is provided, each of the first CPAs 342A, 342B, 342C, and 342D may have a double engagement structure. As such, when each of the first and second CPAs has a double engagement structure, the same may be fixed to the housing more securely and stably. In some cases, although not shown, each of the first and second CPAs may be fixed to the housing in a triple or more multi-engagement structure.

For example, as shown in FIGS. 2A, 11B, 12B, and 13B, the second protrusion-receiving recess 384 may include 2-1st and 2-2nd protrusion-receiving recesses 384A and 384B. The 2-2nd protrusion-receiving recess 384B may be located below the 2-1st protrusion-receiving recess 384A in the third direction.

Further, a weight reduction hole may be formed in each of the first and second CPAs in order to reduce the weight of each of the first and second CPAs. To this end, the weight reduction hole may be a through-hole or a blind hole. For example, as shown in FIG. 3, each of the first and second CPAs 342A and 344A may have a weight reduction hole 390 formed in the rear side thereof in the shape of a through-hole. Alternatively, as shown in FIG. 12B, each of the first and second CPAs 342C and 344C may have weight reduction holes 392 and 394 formed in the upper side thereof in the shape of a through-hole.

The lengths (or heights) h11 and h12 in the third direction of the first and second CPAs 342A and 344A shown in FIG. 7C may be equal to the lengths h21 and h22 in the third direction of the first and second CPAs 342B and 344B shown in FIG. 11B, respectively.

Also, the lengths h31 and h32 in the third direction of the first and second CPAs 342C and 344C shown in FIG. 12B may be shorter than the lengths h11 and h12, respectively. Also, the lengths h41 and h42 in the third direction of the first and second CPAs 342D and 344D shown in FIG. 13B may be shorter than the lengths h11 and h12, respectively.

Also, among the lengths h11, h21, h31, and h41, the length h11 may be set to be the shortest. Also, among the lengths h12, h22, h32, and h42, the length h12 may be set to be the shortest.

The relatively short lengths of the first and second CPAs in the third direction are advantageous from the aspect of packaging. Thus, the lengths h11 to h42 may be determined in consideration thereof.

Hereinafter, a process of assembling the cell-monitoring connector 300A according to the embodiment to the separator 600 will be described with reference to FIGS. 2A, 2B, 3, 5, 8A, 8B, and 15A to 15D.

FIGS. 15A to 15D are views for explaining a process of assembling the cell-monitoring connector 300A to the separator 600.

First, as shown in FIG. 2A, the separator 600, the housing 310A, the connection terminal 320, the TPA 330, and the first and second CPAs 342A and 344A are prepared.

Figure 15A:
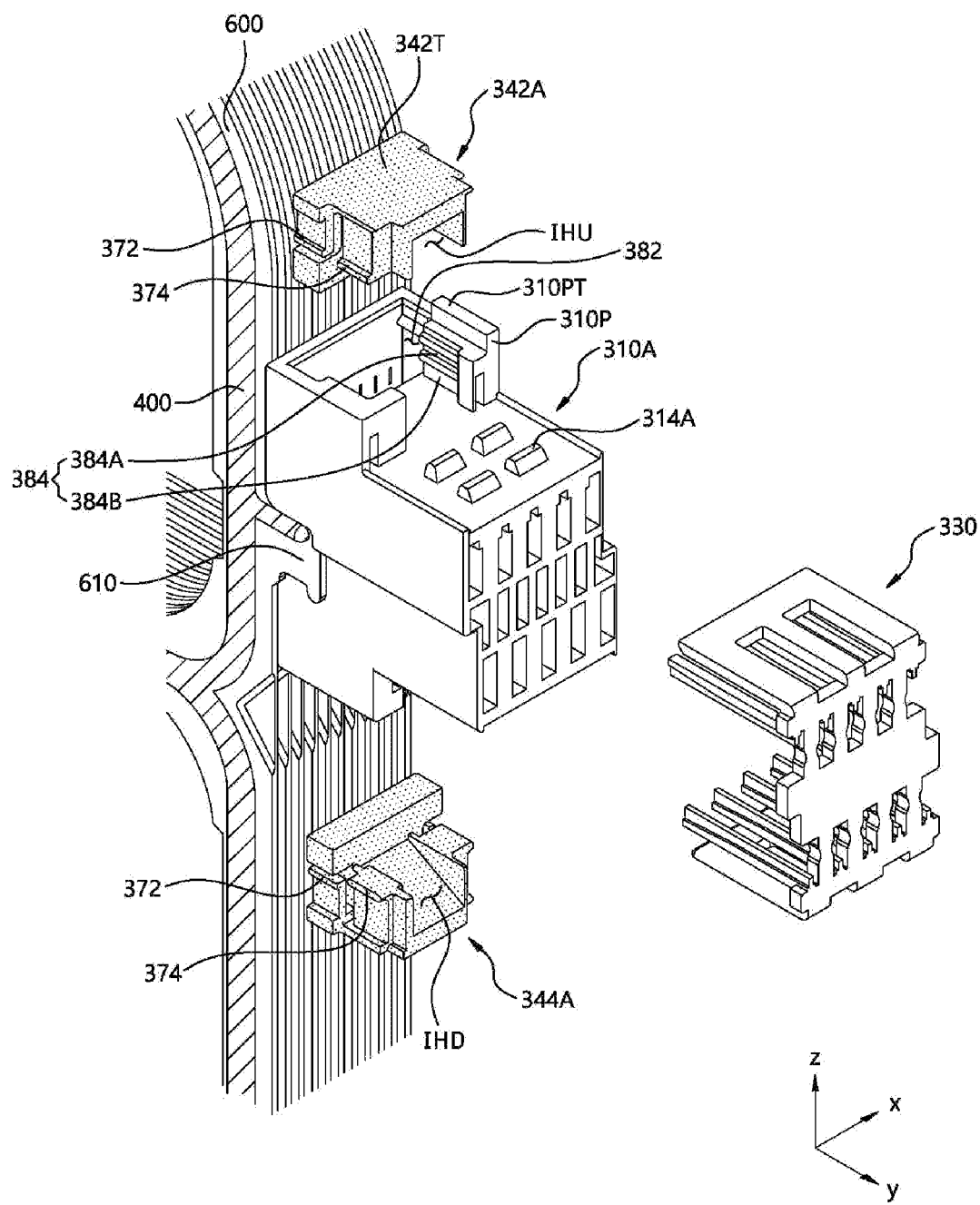
FIGS. 15A to 15D are views for explaining a process of assembling the cell-monitoring connector to the separator.

Thereafter, as shown in FIG. 15A, the housing 310A is moved in the second direction to be engaged with the separator 600.

Figure 15B:
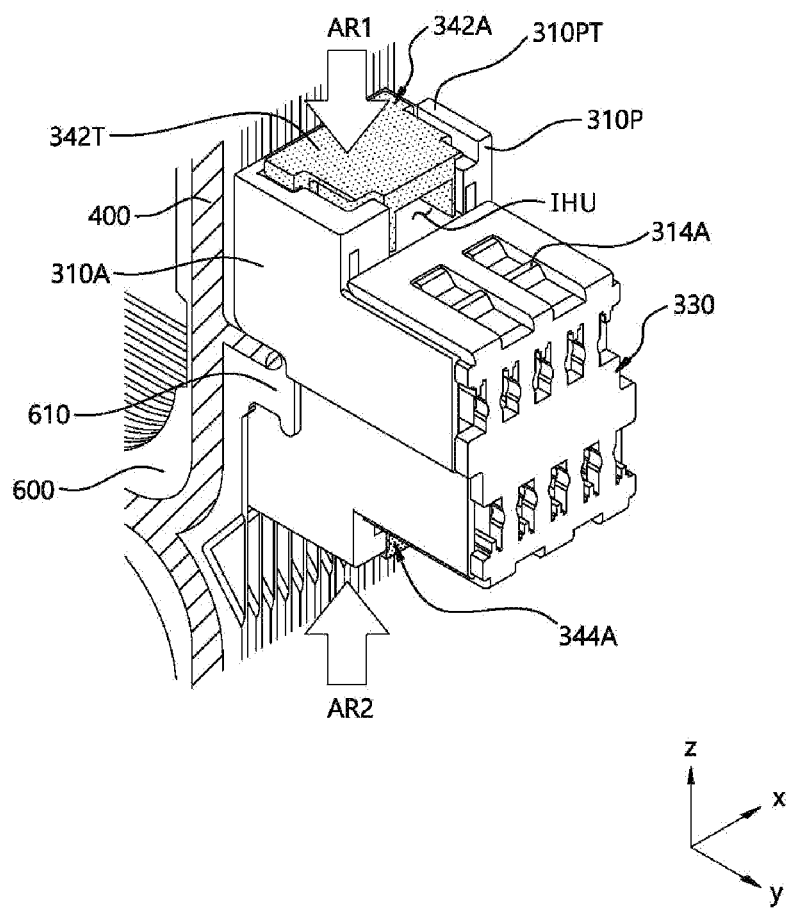

Thereafter, as shown in FIG. 15B, the TPA 330 is engaged with the housing 310A.

Figure 15C:
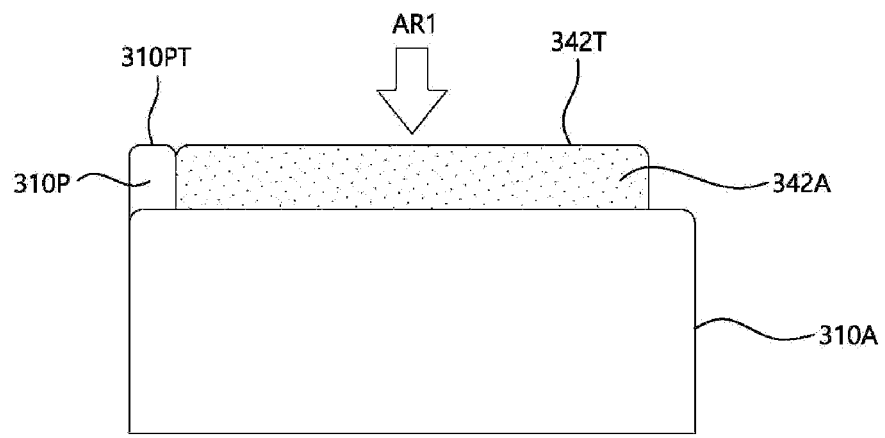

Thereafter, as shown in FIGS. 8A, 15B, and 15C, the first CPA 342A is primarily pressed in the direction of the arrow AR1 so as to be engaged with the housing 310A. At this time, as shown in FIGS. 15B and 15C, the first top surface 342T may be located in the same horizontal plane as the top surface 310PT of the protruding portion 310P. In this case, the first engagement protrusion 372 shown in FIGS. 2A, 2B, and 3 is received in the first protrusion-receiving recess 382, and the second engagement protrusion 374 is received in the 2-1st protrusion-receiving recess 384A.

Figure 15D:
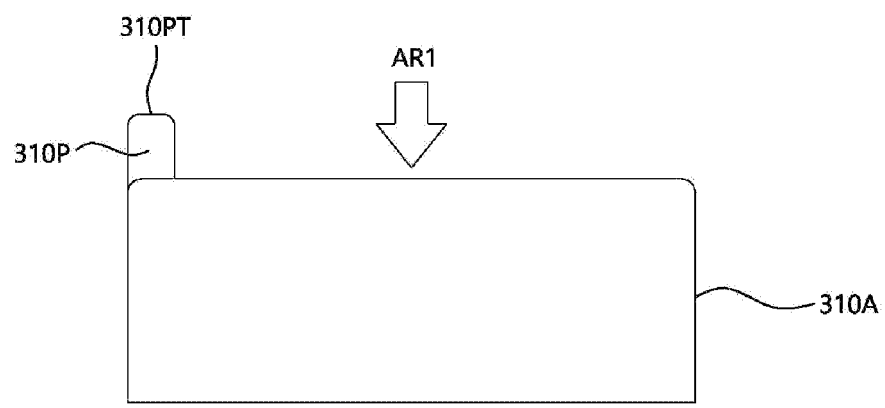

Thereafter, as shown in FIGS. 8B, 5, and 15D, the first CPA 342A is secondarily further pressed in the direction of the arrow AR1, so the first lower portion DP1 of the first CPA 342A is inserted into and locked in the first groove portion HPU. At this time, as shown in FIG. 15D, the first top surface 342T may be located in the same horizontal plane as the top surface 310T of the housing 310A. In this case, the first engagement protrusion 372 shown in FIGS. 2A, 2B, and 3 is moved downwards in the third direction within the first protrusion-receiving recess 382, and the second engagement protrusion 374 escapes from the 2-1st protrusion-receiving recess 384A and is received in the 2-2nd protrusion-receiving recess 384B in a slide-fitting manner.

Meanwhile, as shown in FIG. 8A, the second CPA 344A is primarily pressed in the direction of the arrow AR2 so as to be engaged with the housing 310A. Thereafter, as shown in FIGS. 8B and 5, the second CPA 344A is secondarily further pressed in the direction of the arrow AR2, so the second lower portion DP2 of the second CPA 344A is inserted into and locked in the second groove portion HPD. At this time, the second top surface 344T may be located in the same horizontal plane as the lower surface 310BT of the housing 310A. Similar to the first CPA 342A, when the second CPA 344A is primarily and secondarily engaged with the housing 310A, the first and second engagement protrusions 372 and 374 of the second CPA 344A are received in the first and second protrusion-receiving recesses (not shown).

Thereafter, the connection terminal 320 may be inserted into the TPA 330.

The first and second CPAs 342A and 344A may be respectively locked in the first and second groove portions HPU and HPD at the same time. Alternatively, after the first CPA 342A is locked in the first groove portion HPU, the second CPA 344A may be locked in the second groove portion HPD. Alternatively, after the second CPA 344A is locked in the second groove portion HPD, the first CPA 342A may be locked in the first groove portion HPU.

Hereinafter, a process of assembling each of the cell-monitoring connectors 300B, 300C, and 300D according to the embodiments to the separator 600 will be described with reference to FIGS. 11A to 13B and 16A to 18B. Except for the difference in the configuration whereby the first and second engagement protrusions are received in the first and second protrusion-receiving recesses, the process of assembling each of the cell-monitoring connectors 300B, 300C, and 300D to the separator 600 is the same as the process of assembling the cell-monitoring connector 300A to the separator 600, and thus a duplicate description of identical content will be omitted.

Figure 16A:
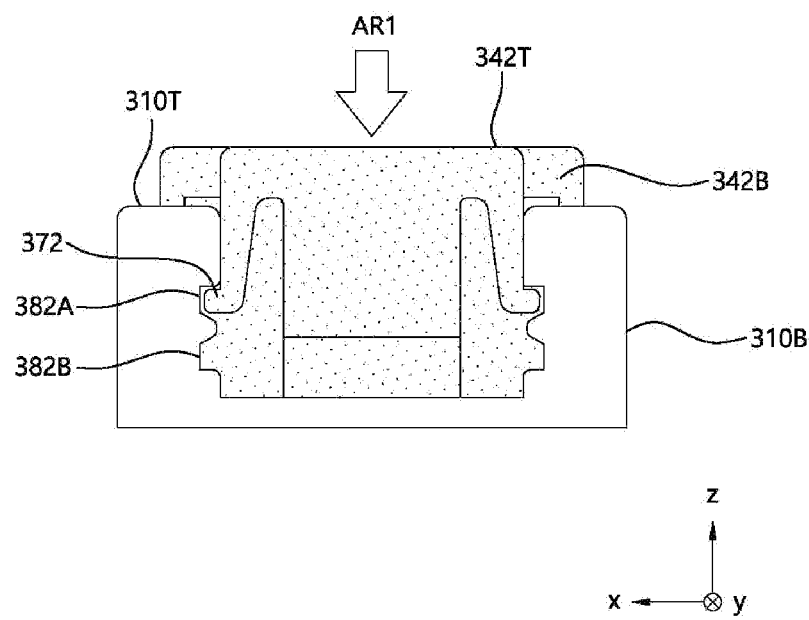
FIGS. 16A and 16B are rear views for explaining a process of assembling the cell-monitoring connector according to another embodiment to the separator.
Figure 16B:
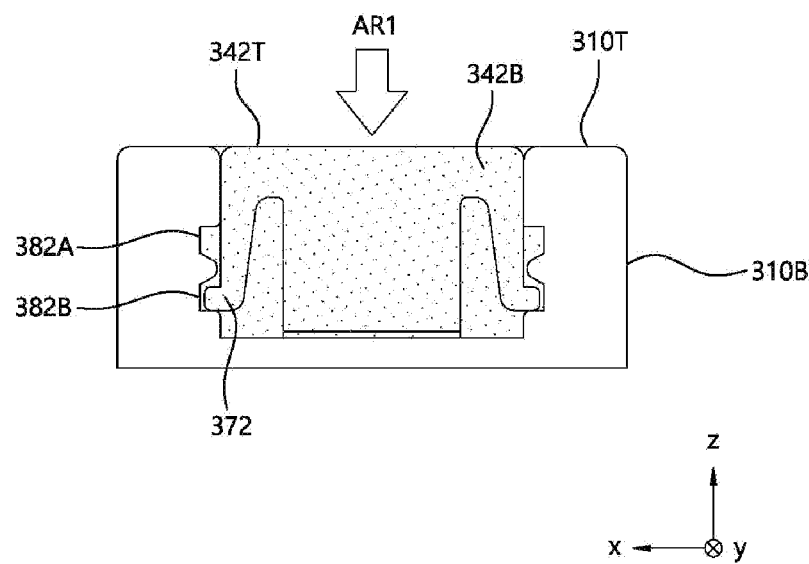

FIGS. 16A and 16B are rear views for explaining a process of assembling the cell-monitoring connector 300B according to the embodiment to the separator 600.

As shown in FIGS. 11A and 16A, the first CPA 342B is primarily pressed in the direction of the arrow AR1 so as to be engaged with the housing 310B. In this case, the first engagement protrusion 372 is received in the 1-1st protrusion-receiving recess 382A, and the second engagement protrusion 374 is received in the 2-1st protrusion-receiving recess 384A.

Thereafter, as shown in FIG. 16B, the first CPA 342B is secondarily further pressed in the direction of the arrow AR1, so the first lower portion DP1 of the first CPA 342B is inserted into and locked in the first groove portion HPU. At this time, as shown in FIG. 16B, the first top surface 342T may be located in the same horizontal plane as the top surface 310T of the housing 310B. In this case, the first engagement protrusion 372 is moved downwards from the 1-1st protrusion-receiving recess 382A in the third direction and is received in the 1-2nd protrusion-receiving recess 382B in a slide-fitting manner, and the second engagement protrusion 374 is moved downwards from the 2-1st protrusion-receiving recess 384A in the third direction and is received in the 2-2nd protrusion-receiving recess 384B in a slide-fitting manner.

Figure 17A:
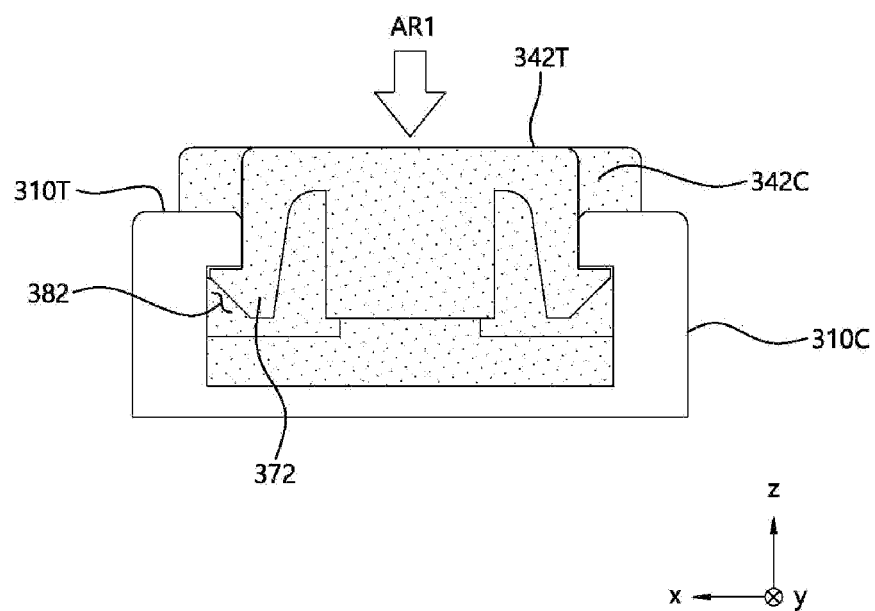
FIGS. 17A and 17B are rear views for explaining a process of assembling the cell-monitoring connector to the separator.
Figure 17B:
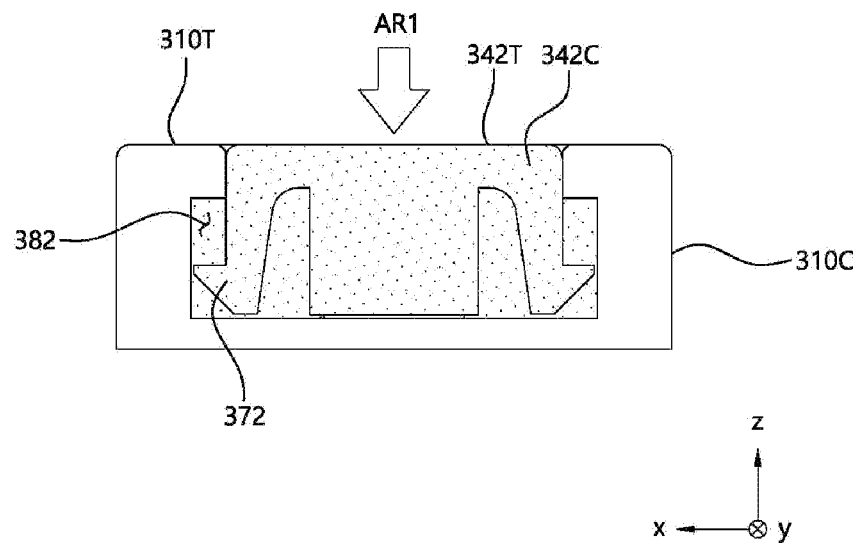

FIGS. 17A and 17B are rear views for explaining a process of assembling the cell-monitoring connector 300C according to the embodiment to the separator 600.

As shown in FIGS. 12A and 17A, the first CPA 342C is primarily pressed in the direction of the arrow AR1 so as to be engaged with the housing 310C. In this case, the first engagement protrusion 372 is received in the first protrusion-receiving recess 382, and the second engagement protrusion 374 is received in the 2-1st protrusion-receiving recess 384A.

Thereafter, as shown in FIG. 17B, the first CPA 342C is secondarily further pressed in the direction of the arrow AR1, so the first lower portion DP1 of the first CPA 342C is inserted into and locked in the first groove portion HPU. At this time, as shown in FIG. 17B, the first top surface 342T may be located in the same horizontal plane as the top surface 310T of the housing 310C. In this case, the first engagement protrusion 372 is moved downwards in the third direction within the first protrusion-receiving recess 382, and the second engagement protrusion 374 is moved downwards from the 2-1st protrusion-receiving recess 384A in the third direction and is received in the 2-2nd protrusion-receiving recess 384B in a slide-fitting manner.

Figure 18A:
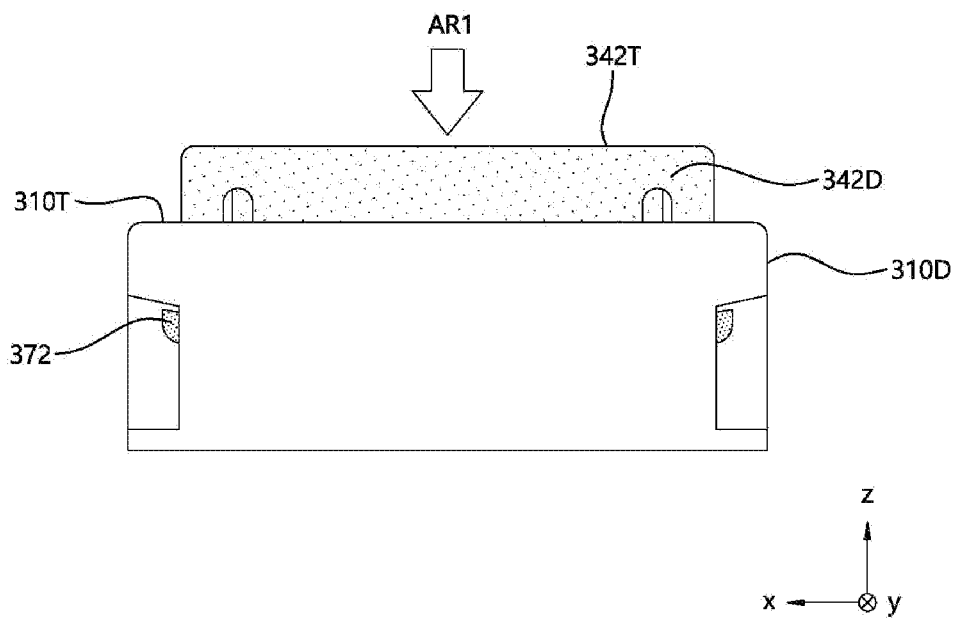
FIGS. 18A and 18B are rear views for explaining a process of assembling the cell-monitoring connector to the separator.
Figure 18B:
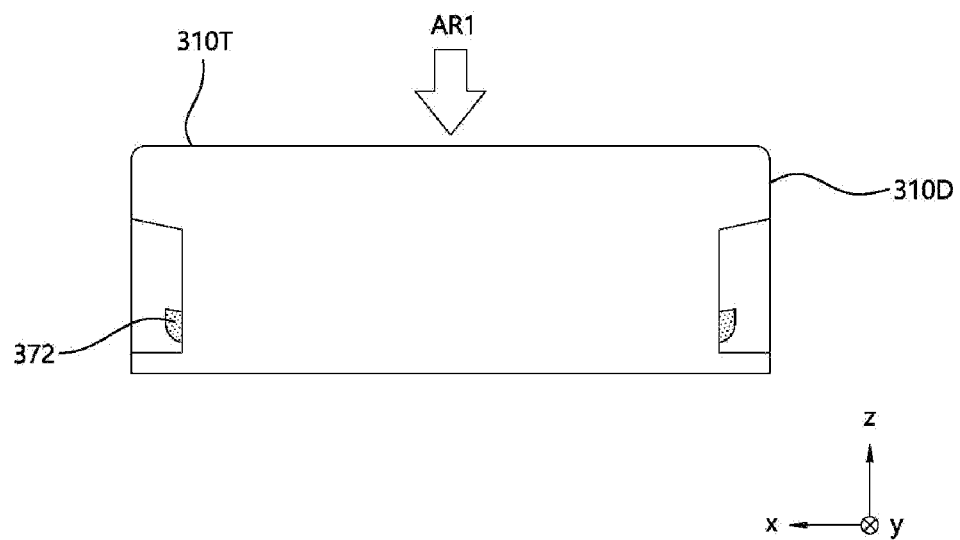

FIGS. 18A and 18B are rear views for explaining a process of assembling the cell-monitoring connector 300D according to the embodiment to the separator 600.

As shown in FIGS. 13A and 18A, the first CPA 342D is primarily pressed in the direction of the arrow AR1 so as to be engaged with the housing 310D. In this case, the first engagement protrusion 372 is received in the 1-1st protrusion-receiving recess 382C, and the second engagement protrusion 374 is received in the 2-1st protrusion-receiving recess 384A.

Thereafter, as shown in FIG. 18B, the first CPA 342D is secondarily further pressed in the direction of the arrow AR1, so the first lower portion DP1 of the first CPA 342D is inserted into and locked in the first groove portion HPU. At this time, as shown in FIG. 18B, the first top surface 342T may be located in the same horizontal plane as the top surface 310T of the housing 310D. In this case, the first engagement protrusion 372 is moved downwards from the 1-1st protrusion-receiving recess 382C and is received in the 1-2nd protrusion-receiving recess 382D in a slide-fitting manner, and the second engagement protrusion 374 is moved downwards from the 2-1st protrusion-receiving recess 384A in the third direction and is received in the 2-2nd protrusion-receiving recess 384B in a slide-fitting manner.

Hereinafter, a process of removing (or separating) the cell-monitoring connector 300A according to the embodiment, which has been assembled to the separator 600, from the separator 600 will be described with reference to the accompanying drawings.

Figure 19A:
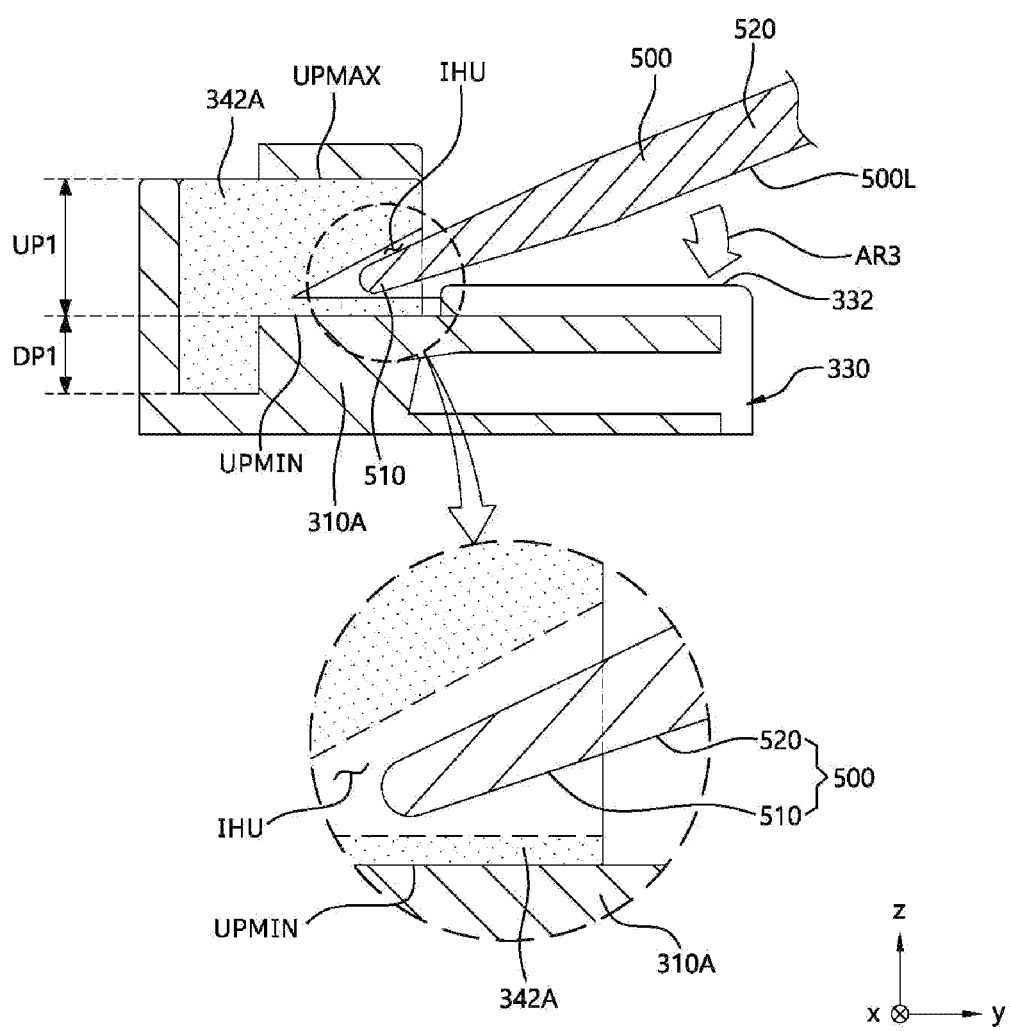
FIGS. 19A to 19C are views for explaining a process of separating the cell-monitoring connector from the separator.
Figure 19B:
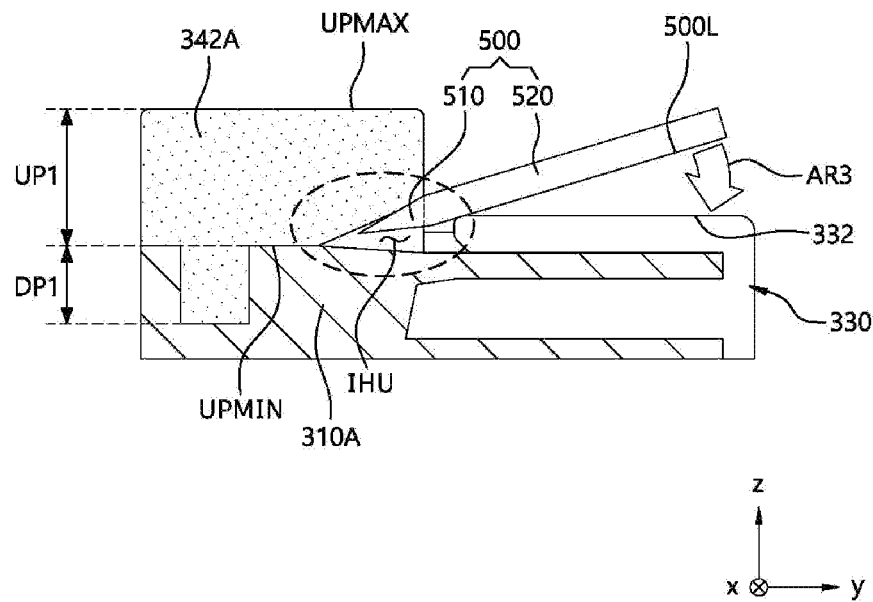
Figure 19C:
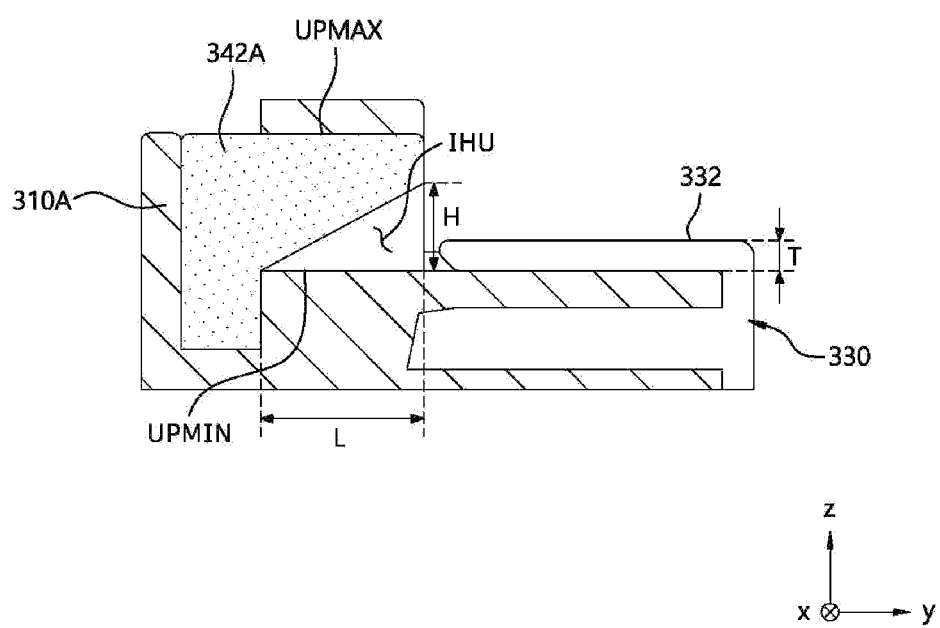

FIGS. 19A to 19C are views for explaining a process of separating the cell-monitoring connector 300A from the separator 600.

Prior to describing the separation process, the configuration for separation of each of the first and second CPAs 342A and 344A will now be described briefly.

Referring to FIGS. 2A, 2B, 5, 7C, 19A, and 19B, the first CPA 342A may have therein an insertion hole (hereinafter referred to as a "first insertion hole") IHU inwardly recessed in the second direction in order to receive a removal tool 500 inserted thereinto from the outside, and the second CPA 344A may have therein an insertion hole (hereinafter referred to as a "second insertion hole") IHD inwardly recessed in the second direction in order to receive the removal tool 500 inserted thereinto from the outside.

According to an embodiment, as shown in FIG. 19A, the first insertion hole IHU may be located between the lower end UPMIN and the upper end UPMAX of the first upper portion UP1. In this case, the first insertion hole IHU may be located closer to the lower end UPMIN than to the upper end UPMAX.

According to another embodiment, as shown in FIG. 19B, the first insertion hole IHU may be located so as to be in contact with the lower end UPMIN of the first upper portion UP1.

Also, according to an embodiment, the second insertion hole IHD may be located between the lower end UPMIN and the upper end UPMAX of the second upper portion UP2. In this case, the second insertion hole IHD may be located closer to the lower end UPMIN than to the upper end UPMAX.

According to another embodiment, the second insertion hole IHD may be located so as to be in contact with the lower end UPMIN of the second upper portion UP2.

Also, the height of each of the first and second insertion holes IHU and IHD in the third direction may gradually decrease from the entrance thereof to the innermost portion thereof. The reason for this is to enable a worker to remove the first and second CPAs 342A and 344A from the housing 310A by pressing the removal tool 500 in the direction of the arrow AR3 using the principle of a lever, as shown in FIGS. 19A and 19B.

The first and second CPAs 342A and 344A having the above-described configurations may be removed from the housing 310A as follows.

First, as shown in FIG. 19A or 19B, the removal tool 500 is inserted into the first insertion hole IHU.

Thereafter, as shown in FIG. 19A or 19B, when the removal tool 500 is primarily pressed in the direction of the arrow AR3, the first CPA 342A may be primarily removed, as shown in FIG. 15B.

Thereafter, when the removal tool 500 is secondarily further pressed in the direction of the arrow AR3, the first CPA 342A may be completely removed from the housing 310A, as shown in FIG. 15A.

The second CPA 344A may be removed from the housing 310A in the same method as the method of removing the first CPA 342A from the housing 310A. That is, the removal tool 500 is inserted into the second insertion hole IHD.

Thereafter, the removal tool 500 is primarily pressed to primarily remove the second CPA 344A, as shown in FIG. 15B. Thereafter, the removal tool 500 is secondarily further pressed, whereby the second CPA 344A is completely removed from the housing 310A, as shown in FIG. 15A.

The first and second CPAs 342A and 344A may be simultaneously unlocked from the first and second groove portions HPU and HPD and removed from the housing 310A. Alternatively, after the first CPA 342A is unlocked from the first groove portion HPU and removed from the housing 310A, the second CPA 344A may be unlocked from the second groove portion HPD and removed from the housing 310A. Alternatively, after the second CPA 344A is unlocked from the second groove portion HPD and removed from the housing 310A, the first CPA 342A may be unlocked from the first groove portion HPU and removed from the housing 310A.

In the state in which one side 510 of the removal tool 500 is inserted into the first insertion hole IHU, when the opposite side 520 of the removal tool 500 is pressed in the third direction (the direction of the arrow AR3 shown in FIGS. 19A and 19B), the position of the upper portion 332 of the TPA 330 may be determined to unlock the first CPA 342A from the first groove portion HPU by contacting the upper portion 332 of the TPA 330 with the lower surface 500L of the removal tool 500. Similarly, although not shown, in the state in which one side of the removal tool 500 is inserted into the second insertion hole IHD, when the opposite side of the removal tool 500 is pressed in the third direction (e.g. the +z-axis direction), the position of the lower portion 334 of the TPA 330 may be determined to unlock the second CPA 344A from the second groove portion HPD by contacting the lower portion 334 of the TPA 330 with the lower surface of the removal tool 500.

Referring to FIG. 19C, in order to allow the removal tool 500 to be inserted into the first insertion hole IHU, the height H of the entrance of the first insertion hole IHU from a horizontal plane may be greater than the thickness T of the upper portion 332 of the TPA 330 from the same horizontal plane. In addition, in order to remove the first CPA 342A using the principle of a lever, the length L of the first insertion hole IHU in the second direction may be greater than the height H. The height of the second insertion hole IHD, the thickness of the upper portion of the TPA 330, and the length of the second insertion hole IHD in the second direction may be determined in a manner similar thereto.

When the opposite side 520 of the removal tool 500 is pressed in the third direction AR3, the TPA 330 may be moved so as to be separated or pushed from the housing 310A. However, according to the embodiment, the upper fixing piece 330U of the TPA 330 is engaged with the first locking protrusion 314A, and the lower fixing piece 330D of the TPA 330 is engaged with the second locking protrusion 314B, whereby the TPA 330 is prevented from being moved when the opposite side 520 of the removal tool 500 is pressed in the third direction.

Also, according to the embodiment, the first insertion hole IHU and the second insertion hole IHD may have shapes that are symmetrical to each other in the third direction with respect to the center of the housing 310A.

The front views of the first and second CPAs 342A and 344A are illustrated in the circular dotted lines in FIG. 2A. For example, referring to FIG. 2A, the first insertion hole IHU is defined by the first upper plate UPT1 and the first side plate SPT1 of the first CPA 342A and the housing 310A, and the second insertion hole IHD is defined by the second upper plate UPT2 and the second side plate SPT2 of the second CPA 344A and the housing 310A. As such, when the first insertion hole IHU and the second insertion hole IHD have shapes that are symmetrical to each other in the third direction with respect to the center of the housing 310A, it is possible to prevent erroneous insertion of the first CPA 342A into the portion for receiving the second CPA 344A or erroneous insertion of the second CPA 344A into the portion for receiving the first CPA 342A, thereby improving assembly convenience.

Although the shapes of the first and second CPAs and the shapes of the portions of the housing in which the first and second CPAs are received are different, the process of removing (or separating) the cell-monitoring connector 300B, 300C, or 300D, which has been assembled to the separator 600, from the separator 600 is the same as the process of removing (or separating) the cell-monitoring connector 300A, which has been assembled to the separator 600, from the separator 600, and thus a duplicate description of identical content will be omitted.

Hereinafter, a cell-monitoring connector for a fuel cell according to a comparative example and the cell-monitoring connector according to the embodiment will be described in comparison with each other.

Figure 20A:
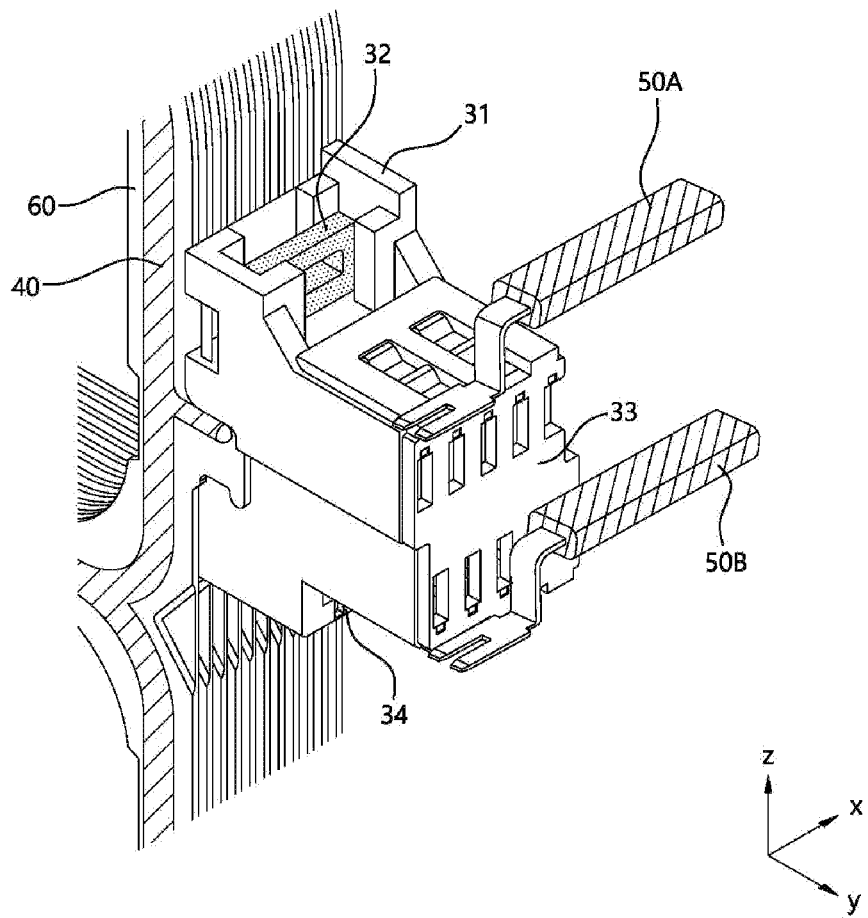
FIGS. 20A and 20B are, respectively, a perspective view and a cross-sectional view showing the assembled state of a cell-monitoring connector for a fuel cell according to a comparative example and the separator.
Figure 20B:
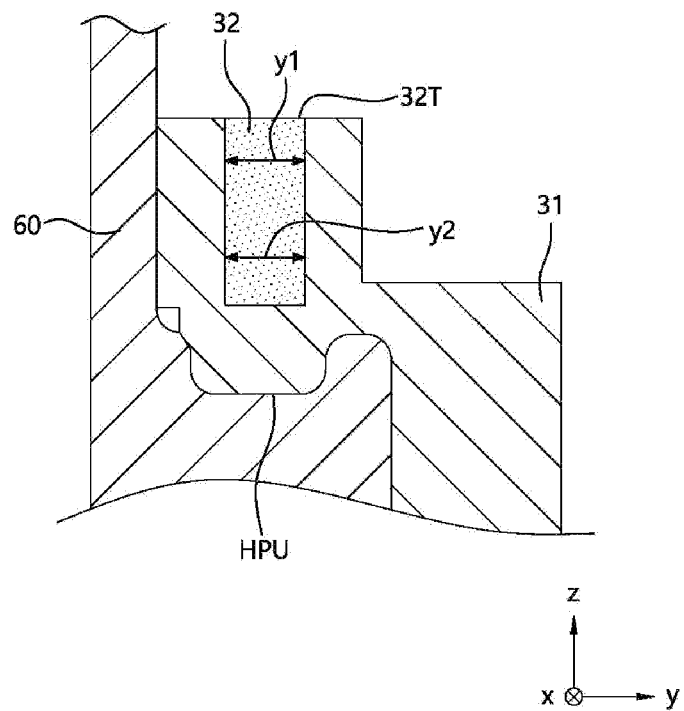
Figure 21:
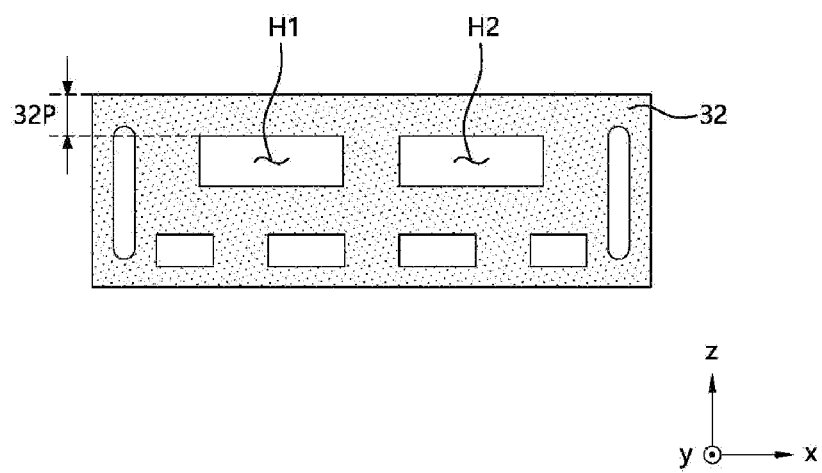
FIG. 21 is a front view of a first CPA according to the comparative example.

FIGS. 20A and 20B are, respectively, a perspective view and a cross-sectional view showing the assembled state of a cell-monitoring connector for a fuel cell according to a comparative example and the separator 60, and FIG. 21 is a front view of a first CPA 32 according to the comparative example.

The cell-monitoring connector according to the comparative example shown in FIGS. 20A and 20B may be assembled to the separator 6o, and may include a housing 31, a first CPA 32, a TPA 33, and a second CPA 34. The housing 31, the first CPA 32, the TPA 33, the second CPA 34, the gasket 40, the removal tools 50A and 50B, and the separator 60 shown in FIGS. 20A and 20B perform the same functions as the housing 310A, the first CPA 342A, the TPA 330, the second CPA 344A, the gasket 400, the removal tool 500, and the separator 600 according to the embodiment, respectively, and thus a duplicate description thereof will be omitted.

In order to assemble the cell-monitoring connector according to the comparative example to the separator 60, the removal tools 50A and 50B need to be used. The reason for this is that the area of the top surface (e.g. 32T) of each of the first and second CPAs 32 and 34 is very small. When the first and second CPAs 32 and 34 are assembled to the housing 31 using the removal tools 50A and 50B, the time taken to assemble the cell-monitoring connector to the separator 60 is increased. Further, the first and second CPAs 32 and 34 need to be assembled to the housing 31 one by one, which may impose a burden on a worker and may further increase the time taken for assembly.

Furthermore, when removing the first and second CPAs 32 and 34 in the third direction by inserting the removal tools 50A and 50B into the holes H1 and H2 in the first and second CPAs 32 and 34, the wall portions 32P of the first and second CPAs 32 and 34 may be damaged by the large amount of force transferred thereto via the removal tools 50A and 50B.

In contrast, according to the embodiment, with regard to the first CPAs 342A to 342D and the second CPAs 344A to 344D, the areas of the upper portions UP1 and UP2 are larger than the areas of the lower portions DP1 and DP2, thus enabling a worker to manually assemble the first CPAs 342A to 342D and the second CPAs 344A to 344D to the housings 310A to 310D without using the removal tools 50A and 50B. That is, a worker is capable of assembling the first CPAs 342A to 342D and the second CPAs 344A to 344D to the housings 310A to 310D by pressing the top surfaces 342T and 344T of the first CPAs 342A to 342D and the second CPAs 344A to 344D by hand so that the first CPAs 342A to 342D and the second CPAs 344A to 344D are inserted into the housings 310A to 310D. Accordingly, unlike the comparative example, it is possible to assemble the first CPAs 342A to 342D and the second CPAs 344A to 344D to the housings 310A to 310D at the same time. Accordingly, the time taken to assemble the cell-monitoring connectors 300A to 300D to the separator 600 may be shortened, and a worker may easily and conveniently perform the assembly process. Further, the insertion holes IHU and IHD, into which the removal tool 500 is inserted in order to remove the first CPAs 342A to 342D and the second CPAs 344A to 344D of the cell-monitoring connectors 300A to 300D from the housings 310A to 310D, are located at the middle portions or the lower portions of the first CPAs 342A to 342D and the second CPAs 344A to 344D, thereby preventing damage to the wall portions 32P of the first and second CPAs, unlike the comparative example. Further, the height of each of the insertion holes IHU and IHD gradually decreases from the entrance thereof to the innermost portion thereof, thus further reducing the possibility of the wall portions 32P of the first and second CPAs being damaged.

In the case of the comparative example, the first and second CPAs 32 and 34 are removed from the housing 31 using the removal tools 50A and 50B in the manner shown in FIG. 20A, which may impose a large burden on a worker and may increase the time taken for removal, leading to deterioration in workability.

In contrast, in the case of the embodiment, although the removal tool 500 is used as in the comparative example, it is possible to easily remove the first CPAs 342A to 342D and the second CPAs 344A to 344D from the housings 310A to 310D using the principle of a lever, which may reduce the burden imposed on a worker and may shorten the time taken for removal, leading to improvement of workability.

Further, the housings 310B, 310C, and 310D shown in FIGS. 11B, 12B, and 13B are respectively provided with protruding portions B, C, and D. This may deteriorate injection moldability of the housings 310B, 310C, and 310D and may entail damage to the housings when external impact is applied thereto. However, the housing 310A shown in FIGS. 2A and 2B is not provided with any of the protruding portions B, C, and D. Accordingly, the injection moldability of the housing 310A may be improved, and damage thereto in the event of an external impact may be prevented.

Further, the rear surfaces of the first CPAs 342B and 342C and the second CPAs 344B and 344C shown in FIGS. 11A and 12A are exposed to the outside, rather than being embedded in the housings 310B and 310C. This may deteriorate injection moldability of the housings and may entail damage to the housings when external impact is applied thereto. However, as shown in FIGS. 3 and 13A, since the rear surfaces of the first CPAs 342A and 342D and the second CPAs 344A and 344D are embedded in the housings 310A and 310D, the injection moldability of the housings may be improved, and damage thereto in the event of an external impact may be prevented. In particular, as shown in FIG. 3, when the rear surfaces of the first CPA 342A and the second CPA 344A are completely embedded in the housing 310A, the injection moldability of the housing 310A may be further improved, and damage thereto in the event of an external impact may be more assuredly prevented.

Among the first CPAs 342A to 342D shown in FIGS. 14(a) to 14(d), the first CPA 342A shown in FIG. 14(a) has a planar shape that is most similar to the shape of the finger of a worker. Accordingly, when manually pressing the first CPAs 342A to 342D and the second CPAs 344A to 344D in order to assemble the same to the housings 310A to 310D, a worker may easily and conveniently perform assembly due to the planar shapes of the first CPA 342A and the second CPA 344A shown in FIG. 14(a).

As is apparent from the above description, according to a cell-monitoring connector for a fuel cell according to the embodiment, the time taken to assemble or remove the cell-monitoring connector to or from a separator may be shortened, and the burden imposed on a worker may be reduced. Accordingly, the worker is capable of easily and conveniently performing assembly and removal processes. In addition, it is possible to prevent damage to a wall portion of a CPA when removing the cell-monitoring connector from the separator.

However, the effects achievable through the embodiments are not limited to the above-mentioned effects, and other effects not mentioned herein will be clearly understood by those skilled in the art from the above description.

The above-described various embodiments may be combined with each other without departing from the scope of the present disclosure unless they are incompatible with each other.

In addition, for any element or process that is not described in detail in any of the various embodiments, reference may be made to the description of an element or a process having the same reference numeral in another embodiment, unless otherwise specified.

While the present disclosure has been particularly shown and described with reference to exemplary embodiments thereof, these embodiments are only proposed for illustrative purposes, and do not restrict the present disclosure, and it will be apparent to those skilled in the art that various changes in form and detail may be made without departing from the essential characteristics of the embodiments set forth herein. For example, respective configurations set forth in the embodiments may be modified and applied. Further, differences in such modifications and applications should be construed as falling within the scope of the present disclosure as defined by the appended claims.

What is claimed is:

1. A cell-monitoring connector comprising:
    a housing including a lock portion corresponding to a groove portion defined by lock recesses stacked and overlapped in a first direction of a plurality of unit cells, wherein the lock recesses are formed in at least one of upper portions or lower portions of terminals protruding in a second direction of the plurality of unit cells, the second direction intersecting the first direction toward the cell-monitoring connector from side portions of separators included in the plurality of unit cells; and
    a connector position assurance (CPA) comprising:
        a lower portion configured to be inserted into the lock portion of the housing in a third direction and to be locked in the groove portion; and
        an upper portion extending from the lower portion in the third direction, the upper portion having a top surface having an area larger than an area of the lower portion in a direction intersecting the third direction,
    wherein the CPA is configured to be selectively inserted into the lock portion in the third direction, the third direction intersecting each of the first direction and the second direction, and to be locked in the groove portion in order to prevent the housing from being separated from the separators in the second direction, and
    wherein the housing comprises:
        a first CPA configured to be locked in the groove portion formed by an arrangement of the lock recesses located in the upper portions of the terminals, and
        a second CPA configured to be locked in the groove portion formed by an arrangement of the lock recesses located in the lower portions of the terminals.

2. The cell-monitoring connector according to claim 1, wherein the CPA comprises an insertion hole inwardly recessed in the second direction in order to receive a removal tool insertable from outside.

3. The cell-monitoring connector according to claim 2, wherein the insertion hole is located at a lowermost end of the upper portion.

4. The cell-monitoring connector according to claim 2, wherein the insertion hole is located between a lowermost end and an uppermost end of the upper portion.

5. The cell-monitoring connector according to claim 2, wherein a height of the insertion hole in the third direction gradually decreases from an entrance thereof to an innermost portion thereof.

6. The cell-monitoring connector according to claim 2, further comprising connection terminals configured to be inserted into connection terminal insertion holes so as to be connected to the terminals, the connection terminal insertion holes being located in a front surface of the housing while communicating with slits located in a rear surface of the housing.

7. The cell-monitoring connector according to claim 6, further comprising a terminal position assurance (TPA) configured to be mounted to the front surface of the housing in order to press the connection terminals into the housing.

8. The cell-monitoring connector according to claim 7,
    wherein the TPA includes an upper portion, and
    wherein, when one side of the removal tool is inserted into the insertion hole and when an opposite side of the removal tool is pressed in the third direction, the upper portion of the TPA supports a lower surface of the removal tool so as to unlock the CPA from the groove portion.

9. The cell-monitoring connector according to claim 7,
    wherein the housing includes a locking protrusion protruding in the third direction, and
    wherein the TPA includes a fixing piece configured to be engaged with the locking protrusion so as to fix the TPA when an opposite side of the removal tool is pressed in the third direction.

10. The cell-monitoring connector according to claim 1, further comprising:
    a first insertion hole arranged in the first CPA; and
    a second insertion hole arranged in the second CPA,
        wherein the first insertion hole and the second insertion hole have shapes that are symmetrical to each other in the third direction with respect to a center of the housing.

11. The cell-monitoring connector according to claim 1, wherein the top surface of the CPA and a top surface of the housing are located in the same horizontal plane when the CPA is locked in the groove portion.

12. The cell-monitoring connector according to claim 1, wherein the top surface of the upper portion corresponds to a press-fit surface that is pressed when the CPA is inserted into the lock portion in the third direction.

13. The cell-monitoring connector according to claim 1, wherein the CPA includes a plurality of engagement protrusions protruding in the first direction.

14. The cell-monitoring connector according to claim 13, wherein the housing comprises a plurality of protrusion-receiving recesses formed to receive the plurality of engagement protrusions in a slide-fitting manner when the plurality of engagement protrusions is pressed in the third direction.

15. The cell-monitoring connector according to claim 13, wherein the plurality of engagement protrusions comprises:
    a first engagement protrusion configured to primarily assemble the CPA that has not been assembled to the housing to the housing, and
    a second engagement protrusion configured to fix the CPA that has been primarily assembled to the housing.

16. The cell-monitoring connector according to claim 13, wherein some of the plurality of engagement protrusions protrude in the first direction from first opposite outer side surfaces of the CPA, the first opposite outer side surfaces being located opposite each other in the first direction among outer side surfaces of the CPA.

17. The cell-monitoring connector according to claim 16, wherein remaining ones of the plurality of engagement protrusions protrude in the first direction from second opposite outer side surfaces of the CPA, the second opposite outer side surfaces being spaced apart from or extending from the first opposite outer side surfaces in the second direction.

18. The cell-monitoring connector according to claim 1, wherein the CPA includes at least one shift-preventing portion protruding in the first direction.

19. The cell-monitoring connector according to claim 18, wherein the housing has a shift-preventing-portion-receiving recess to receive the at least one shift-preventing portion in the third direction.

20. A cell-monitoring connector comprising:
a housing including a lock portion corresponding to a groove portion defined by lock recesses stacked and overlapped in a first direction of a plurality of unit cells, wherein the lock recesses are formed in at least one of upper portions or lower portions of terminals protruding in a second direction of the plurality of unit cells, the second direction intersecting the first direction toward the cell-monitoring connector from side portions of separators included in the plurality of unit cells; and
a connector position assurance (CPA) comprising:
  a lower portion configured to be inserted into the lock portion of the housing in a third direction and to be locked in the groove portion; and
  an upper portion extending from the lower portion in the third direction, the upper portion having a top surface having an area larger than an area of the lower portion in a direction intersecting the third direction,
wherein the CPA is configured to be selectively inserted into the lock portion in the third direction, the third direction intersecting each of the first direction and the second direction, and to be locked in the groove portion in order to prevent the housing from being separated from the separators in the second direction,
wherein the CPA includes a plurality of engagement protrusions protruding in the first direction,
wherein some of the plurality of engagement protrusions protrude in the first direction from first opposite outer side surfaces of the CPA, the first opposite outer side surfaces being located opposite each other in the first direction among outer side surfaces of the CPA, and
wherein remaining ones of the plurality of engagement protrusions protrude in the first direction from second opposite outer side surfaces of the CPA, the second opposite outer side surfaces being spaced apart from or extending from the first opposite outer side surfaces in the second direction.

* * * * *